United States Patent
Sahoda et al.

(10) Patent No.: US 6,706,438 B2
(45) Date of Patent: Mar. 16, 2004

(54) FLUID SUPPLY DEVICE FOR FUEL CELL

(75) Inventors: Katsumi Sahoda, Wako (JP); Ryoichiro Takahashi, Wako (JP); Kuri Kasuya, Wako (JP); Kazunori Fukuma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 109 days.

(21) Appl. No.: 09/925,744

(22) Filed: Aug. 10, 2001

(65) Prior Publication Data

US 2002/0022172 A1 Feb. 21, 2002

(30) Foreign Application Priority Data

Aug. 10, 2000 (JP) ........................... P2000-243368
Aug. 10, 2000 (JP) ........................... P2000-243369

(51) Int. Cl.[7] ............................................. H01M 8/04
(52) U.S. Cl. .................... 429/34; 137/111; 137/114
(58) Field of Search .......................... 429/34, 38, 39; 137/111, 114

(56) References Cited

U.S. PATENT DOCUMENTS

| 3,100,496 A | * | 8/1963 | Reiser | 137/111 |
| 3,220,710 A | * | 11/1965 | Forster | 137/114 X |
| 4,228,958 A | * | 10/1980 | Perry | 137/114 X |
| 4,735,554 A | * | 4/1988 | Phillips | 137/114 X |
| 5,030,077 A | * | 7/1991 | Orimoto et al. | 137/114 X |
| 5,441,821 A | | 8/1995 | Merritt et al. | 429/17 |
| 5,671,767 A | * | 9/1997 | Kelly | 137/114 X |

FOREIGN PATENT DOCUMENTS

| DE | 4039903 | * | 9/1991 | B01F/5/04 |
| JP | 08-338398 | | 12/1996 | |
| JP | 09-213353 | | 8/1997 | |
| JP | 09-236013 | | 9/1997 | |

* cited by examiner

*Primary Examiner*—Stephen Kalafut
(74) *Attorney, Agent, or Firm*—Arent Fox Kintner Plotkin & Kahn, PLLC

(57) ABSTRACT

The ejector includes a diffuser, a nozzle, a needle, and a drive section. A throat portion and an increasing diameter portion are formed in a third conduit of the diffuser, and the nozzle and the needle are arranged coaxially with the third conduit. A first taper section of the needle is inserted into an aperture portion of the nozzle, and a second taper section is housed in the increasing diameter portion. A gap between the aperture portion and the first taper section constitutes a first fluid conduit, and a gap between the increasing diameter portion and the second taper section constitutes a second fluid conduit. The needle is provided so as to be shiftable in its axial direction by the drive section, and, by shifting the needle in its axial direction, it is possible to change both the first fluid conduit and the second fluid conduit simultaneously.

8 Claims, 21 Drawing Sheets

FLUID SUPPLY DEVICE FOR FUEL CELL

BACKGROUND OF THE INVENTION

1. Field of the Invention

The present invention relates to a fluid supply device which is used in a supply system for fuel or the like to a fuel cell.

2. Description of the Related Art

A solid macromolecular membrane type fuel cell comprises a stack (called a fuel cell) which is made up of a plurality of cells laminated together, each comprising a solid macromolecular electrolyte membrane sandwiched between an anode and a cathode. Hydrogen is supplied as fuel to the anode and air is supplied as oxidizer to the cathode, and hydrogen ions which are generated by a catalytic reaction at the anode pass through the solid macromolecular electrolyte membrane and migrate as far as the cathode, where these hydrogen ions are subjected to oxidizing and electrochemical reaction by the cathode; and thereby generation of electricity is performed.

In order to maintain the ionic conductivity of a solid macromolecular electrolyte membrane, extra water is mixed into the hydrogen which is supplied to the fuel cell by a moisturizing device or the like. Due to this, water accumulates in the gas conduits in the electrode of the fuel cell, and, in order for these gas conduits not to become blocked up, a certain amount of the fuel flowing through these gas conduits is exhausted.

It is possible to make effective use of this exhaust fuel by recirculating it (hereinafter this fuel flow is also termed "recirculated hydrogen") and mixing it into the fuel (i.e. the hydrogen) which is freshly being fed into the fuel cell, and thus it is possible to enhance the energy efficiency of a solid macromolecular membrane type fuel cell.

In the past, as a fuel cell of the type described above, there has been a known fuel cell device which recirculates the fuel in this manner by using an ejector, such as for example the fuel cell device disclosed in Japanese Patent Application, First Publication No. Hei 9-213353.

A typical prior art type ejector, as shown in FIG. 19, includes a recirculation chamber 2 which is connected to a base end aperture of a diffuser 1 and a recirculation conduit 3 which is connected to this recirculation chamber 2, with a nozzle 4 which is arranged so as to be coaxial with the diffuser 1 projecting within the recirculation chamber 2 so that its end opposes the base end aperture of the diffuser 1. With this ejector, when hydrogen which is freshly being fed into the fuel cell is injected from the nozzle 4 towards the diffuser 1, a negative pressure is generated in the throat portion 5 of the diffuser 1, and the recirculated hydrogen which has been conducted into the recirculation chamber 2 is sucked into the diffuser 1 by this negative pressure, so that the recirculated hydrogen and the hydrogen which is being injected from the nozzle 4 are mixed together and are then ejected from the outlet of the diffuser 1. FIG. 20 roughly shows the pressure distribution in the various regions of such a prior art ejector.

The sucking-in ratio provided by the ejector will be termed its "stoichiometry". The meaning of the term "stoichiometry" is defined, in terms of this example, as being the ratio (Qt/Qa) of the flow Qt of the hydrogen which is ejected from the diffuser (in other words the total flow of hydrogen supply which is provided to the fuel cell) to the flow Qa of the hydrogen which is ejected from the nozzle (in other words the hydrogen consumption flow). Furthermore, if the flow of the recirculated hydrogen which is sucked in from the recirculation chamber to the diffuser is termed Qb, then, since Qt=Qa+Qb, the stoichiometry can be defined as (Qa+Qb)/Qa. When the stoichiometry is defined in this manner, it is possible to say that the greater is the value of the stoichiometry, the greater is the efficiency by which the ejector sucks in recirculated hydrogen.

Now, since with a prior art type ejector the diffuser diameter and the nozzle diameter of a particular ejector are fixed, it is usual to employ choices for the various diameters which are the most suitable for the fluid flow range which is being utilized. In this case, the fluid flow (in terms of this example, the hydrogen consumption flow Qa) is arranged to be a constant value for which the stoichiometry provided by the ejector is maximum.

FIG. 21 shows an example of experimental results which have been obtained with an ejector for fuel supply to a fuel cell for the relationship between stoichiometry value and hydrogen consumption flow Qa (hereinafter termed the "stoichiometry characteristic") with the nozzle diameter as a parameter, and it will be clear from this figure that: on the one hand although the stoichiometry value is elevated when the nozzle diameter becomes small, the hydrogen consumption flow Qa becomes small; while on the other hand, although the hydrogen consumption flow Qa becomes large when the nozzle diameter becomes large, the stoichiometry value becomes small.

In the case of a fuel cell, the stoichiometry value which is required according to the operating state of the fuel cell (hereinafter termed the "required stoichiometry value") is determined as shown in FIG. 21 by the thick solid line, and, since in the case of a fuel cell automobile the hydrogen flow from idling to full output power varies by a factor of 10 to 20, therefore it has been difficult to satisfy the required stoichiometry value over the entire region of hydrogen flow with a single ejector.

In order to solve this problem, a two-stage changeover ejector system has been proposed by the present applicant (in Japanese Patent Application 2000-85291), which changes over between an ejector for small flow which includes a small diameter nozzle and a small diameter diffuser and an ejector for large flow which includes a large diameter nozzle and a large diameter diffuser, and which is fitted with a bypass conduit.

Although with this method it is possible to maintain the stoichiometry characteristic to be satisfactory over a comparatively wide range from a small flow to a large flow, it becomes necessary to provide two ejectors and a flow conduit changeover device; and additionally if, in order further to improve the stoichiometry characteristic, the number of ejectors is increased to 3 or 4, it becomes necessary to change over the fluid flow between these multiple ejectors, which leads to increase of the size and weight of the device, which is most disadvantageous.

Furthermore, in Japanese Patent Application, First Publications Hei 8-338398 and Hei 9-236013 there have been proposed variable flow ejectors, although these are not ejectors for fuel supply to fuel cells.

In the variable flow ejector disclosed in Japanese Patent Application, First Publication No. Hei 8-338398, a rod is included which can shift along its axial direction inside the nozzle, and the aperture area of the tip of the nozzle can be varied by shifting this rod along its axial direction. With this variable flow ejector, it is possible to vary the stoichiometry value by changing the aperture area of the tip of the nozzle in this manner, however, since the diffuser diameter is fixed, this restricts the correspondence relationship between the stoichiometry value and the flow. In this case, it is desirable to set the correspondence relationship which is required by the fuel cell (the correspondence relationship shown by the thick solid line in FIG. 21) in more detail, and to enhance progress in optimization of the stoichiometry value. Furthermore there is the problem that, if the aperture area is made small when the flow is small, the flow resistance due to the wall surface is increased, so that it becomes impossible to obtain the desired stoichiometry characteristic.

On the other hand, in the variable flow ejector disclosed in Japanese Patent Application, First Publication No. Hei 9-236013, the nozzle is made to be shiftable with respect to the diffuser along its axial direction, and a plurality of different nozzles which have different diameters are made available so that it is possible to change over between them. With this variable flow ejector, since it is not possible to vary the nozzle diameter without changing over the nozzle, therefore it cannot be applied as an ejector for a fuel cell which is to be utilized in an automobile, for which variation of the stoichiometry value continuously and moreover over a short time period is demanded.

SUMMARY OF THE INVENTION

The objective of the present invention is to provide a fluid supply device for a fuel cell which can deliver the desired stoichiometry characteristic over a wide range of flow.

In order to achieve the above described objective, the fluid supply device for a fuel cell according to the present invention comprises: a needle which has an end portion; a taper section which is arranged coaxially with the needle; a nozzle which has an aperture portion at its end, with the needle and the taper section being coaxially inserted into the aperture portion, and which emits a first fluid from the aperture portion when the first fluid is supplied to the interior of the nozzle; a diffuser which is provided coaxially with the needle, the taper section, and the nozzle, which sucks in a second flow of fluid by a negative pressure which is generated by the injection of the first flow of fluid, and which mixes the second fluid flow with the first fluid flow and supplies the mixture; a needle position adjustment device which shifts the needle along its axial direction; and a taper section position adjustment device which shifts the taper section along its axial direction; wherein the first fluid flow passes through a first fluid conduit which is constituted by a gap between the needle and the aperture portion of the nozzle, and, after mixing with the second fluid flow, flows through a second fluid conduit which is constituted by a gap between the taper section and the diffuser.

According to this invention, since it is possible to vary the ratio between the first fluid flow and the second fluid flow continuously, thereby it is possible to ensure the desired stoichiometry value over a wide range of flow, from small flow to large flow, and also to ensure the entire flow desired. Furthermore since, simply by shifting the needle and/or the taper section in the axial direction, it is possible to vary the ratio between the first fluid flow and the second fluid flow continuously, thereby it is possible to achieve simplification of the device and reduction of its size and weight. Yet further, since there is no requirement to change over between nozzles, this structure can be applied to a fuel cell for an automobile in which the required stoichiometry value changes continuously and moreover over a short time period.

The taper section may be formed integrally with the needle so as to extend from the end portion of the needle, and the needle position adjustment device may also serve as the taper section position adjustment device.

The shape of the needle may be determined so that the stoichiometry value for the first fluid conduit and the second fluid conduit matches a stoichiometry value which has been set in advance in correspondence with flow. By the stoichiometry value is meant the ratio of the sum of the flow of the first fluid flow and the flow of the second fluid flow (hereinafter termed the total flow) to the flow of the first fluid flow.

By utilizing this type of structure it is possible to vary the ratio of the flows of the first fluid flow and the second fluid flow continuously to the desired flow ratio, and accordingly it is possible to obtain the desired stoichiometry value by changing the position of the needle.

A fluid supply device for a fuel cell according to another aspect of the present invention comprises: a needle which has a taper section at its end; a first nozzle which has an aperture portion at its end, with the taper section of the needle being coaxially inserted into the aperture portion, and which emits a first fluid from the aperture portion when the first fluid is supplied to the interior of the first nozzle; a diffuser which is provided coaxially with the needle and the first nozzle, and which sucks in a second fluid flow by a negative pressure which is generated by injection of the first fluid flow, mixes the second fluid flow with the first fluid flow, and supplies the mixture; a second nozzle which has an aperture portion which faces the diffuser, and which is capable of emitting the first fluid flow from the aperture portion; and a needle position adjustment device which shifts the needle along its axial direction; wherein the first fluid flow is capable of being supplied to the diffuser from a gap between the needle and the aperture portion of the first nozzle, and the first fluid flow is capable of being supplied to the diffuser from the second nozzle.

According to this device, when a first fluid flow of small flow is supplied to the diffuser, it is possible for this first fluid flow to be supplied to the diffuser only from the second nozzle, while, when a first fluid flow of large flow is supplied to the diffuser, it is possible for this first fluid flow to be supplied to the diffuser both from the gap between the aperture portion of the first nozzle and the needle, and also from the second nozzle. Moreover, it is possible to vary the aperture area of the gap between the aperture portion of the first nozzle and the needle continuously, by shifting the needle along its axial direction by the needle position adjustment device. Accordingly, it is possible to adjust the first fluid supplied to the diffuser from a small flow to a large flow continuously. In particular, since it is possible to perform supply only from the second nozzle when a first fluid flow of small flow is being supplied to the diffuser, therefore at this time it is possible to reduce the wall resistance experienced by the first fluid flow.

The aperture portion of the second nozzle may be formed at the end portion of the needle, with the needle also serving as the second nozzle.

In this case, when a first fluid flow of small flow is supplied to the diffuser, it is possible to supply this first fluid flow to the diffuser from the second nozzle only, while, when a first fluid flow of large flow is supplied to the diffuser, it is possible to supply this first fluid flow to the diffuser from the second nozzle from the gap between the first nozzle and the aperture portion of the second nozzle, and also from the second nozzle (in the same manner, it would also be acceptable to supply the first fluid flow from the second nozzle to the diffuser). Moreover, when the first fluid flow is supplied to the diffuser from the gap between the first nozzle and the aperture portion of the second nozzle, it is possible to vary the aperture area of the gap between the first nozzle and the aperture portion of the second nozzle continuously by shifting the second nozzle along its axial direction by a second nozzle position adjustment device which serves as a needle position adjustment device. Accordingly, it is possible to adjust the first fluid supply to the diffuser continuously from a small flow to a large flow. In particular, since it is possible, when supplying a first fluid flow of small flow to the diffuser, to supply it from the second nozzle only, therefore at this time it is possible to reduce the wall resistance which the first fluid flow experiences, and it is possible to avoid deterioration of the stoichiometry when the flow is small. Furthermore, since there is no requirement to change over between nozzles, it is possible to apply this fluid supply device to a fuel cell for use in an automobile in which the required stoichiometry value changes continuously and moreover over a short time period.

It is also possible further to include a fluid supply interruption mechanism which, when the first fluid flow is to be supplied to the diffuser only from the second nozzle, interrupts the supply of the first fluid flow to the first nozzle.

It is also yet further possible for the fluid supply interruption mechanism to interrupt the supply of the first fluid flow to the first nozzle in accompaniment with the shifting of the second nozzle in its axial direction.

In this case, changeover of the supply conduit of the first fluid flow to the diffuser and variation of the area of the gap between the first nozzle and the aperture portion of the second nozzle may be simultaneously performed, just by simply shifting the second nozzle in its axial direction. Accordingly, it is possible to operate this fuel supply device with a single actuator.

DETAILED DESCRIPTION OF THE PREFERRED EMBODIMENTS

In the following, various preferred embodiments of the fluid supply device for a fuel cell according to the present invention will be described with reference to the figures.

Embodiment 1

Figure 1:
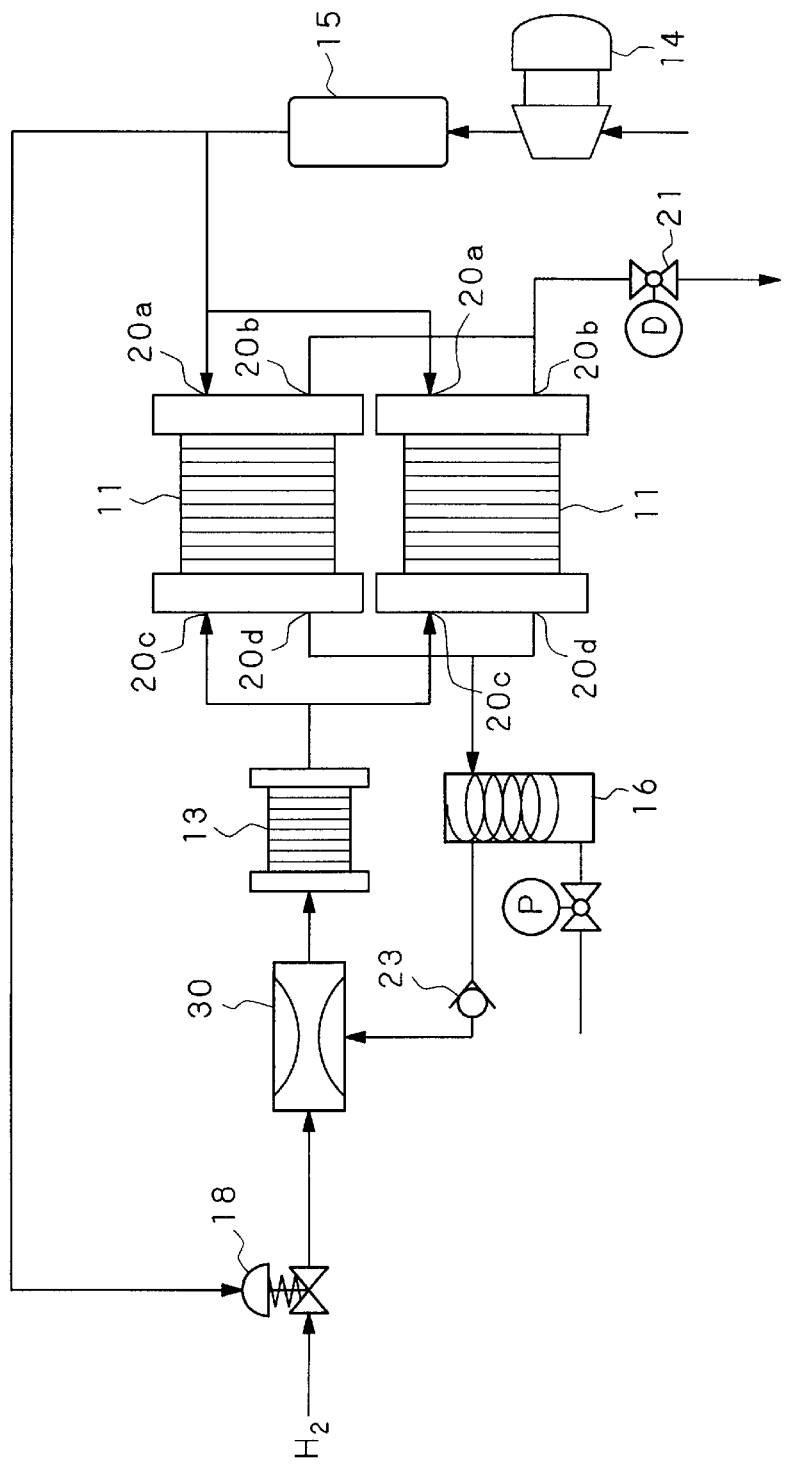
FIG. 1 is a block diagram of a fuel supply system for a fuel cell which incorporates a fluid supply device according to the present invention.

The first preferred embodiment of the present invention will now be described with reference to FIGS. 1 through 8. FIG. 1 is a block diagram of a fuel supply system for a fuel cell which incorporates a fluid supply device according to the present invention. This fuel supply system for a fuel cell is mounted to a vehicle such as, for example, an electrically powered automobile or the like, and it comprises a plurality of fuel cells 11, a moisturizing section 13, an oxidizer supply section 14, a heat exchanger section 15, a water separator section 16, an ejector (fluid supply device) 30, and a fuel supply side pressure control section 18.

The fuel cells 11 are each made up from a stack of a plurality of cells laminated together, each comprising a solid macromolecular electrolyte membrane such as for example a solid polymer ion interchange membrane or the like sandwiched between an anode and a cathode, and comprising a fuel pole to which hydrogen, for example, is supplied as fuel, and an air pole to which air containing oxygen, for example, is supplied as an oxidizer.

To the air poles there are provided air supply apertures 20a to which air is supplied from the oxidizer supply section 14 and air exhaust apertures 20b for exhausting air or the like in the air poles to the outside, to which there is provided an air exhaust valve 21. On the other hand, to the fuel poles there are provided fuel supply apertures 20c to which hydrogen fuel is supplied and fuel exhaust apertures 20d for exhausting hydrogen or the like in the fuel poles to the outside.

The oxidizer supply section 14 consists of, for example, an air compressor, and it is controlled according to the negative pressure in the fuel cells 11 or according to an input signal from an accelerator pedal (not shown in the figures) or the like; and, via the heat exchanger section 15, along with supplying air to the air poles of the fuel cells 11, it also supplies air to the fuel supply side pressure control section 18.

The heat exchanger section 15 warms the air from the oxidizer supply section 14 up to a predetermined temperature, and supplies it to the fuel cell 11.

The hydrogen which is to serve as fuel is supplied via the fuel supply side pressure control section 18, the ejector 30, and the moisturizing section 13 to the fuel supply apertures 20c, whence it is supplied to the fuel poles of the fuel cells 11.

After humidifying the hydrogen which is supplied by mixing water vapor into it, the moisturizing section 13 supplies this moisturized hydrogen to the fuel cells 11, thus ensuring the ionic conductivity of the solid macromolecular electrolyte membranes therein.

Figure 2:
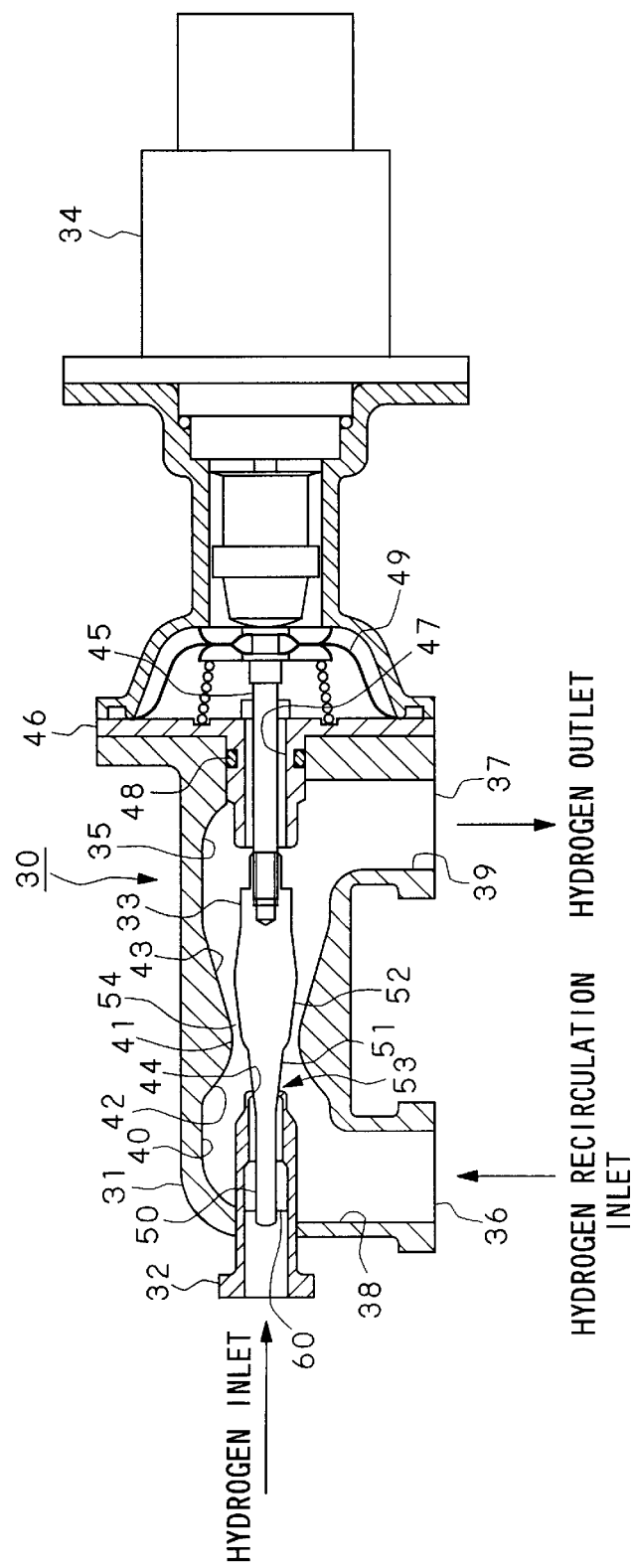
FIG. 2 is a sectional view of an ejector which is a first preferred embodiment of the fluid supply device for a fuel cell according to the present invention.
Figure 3:
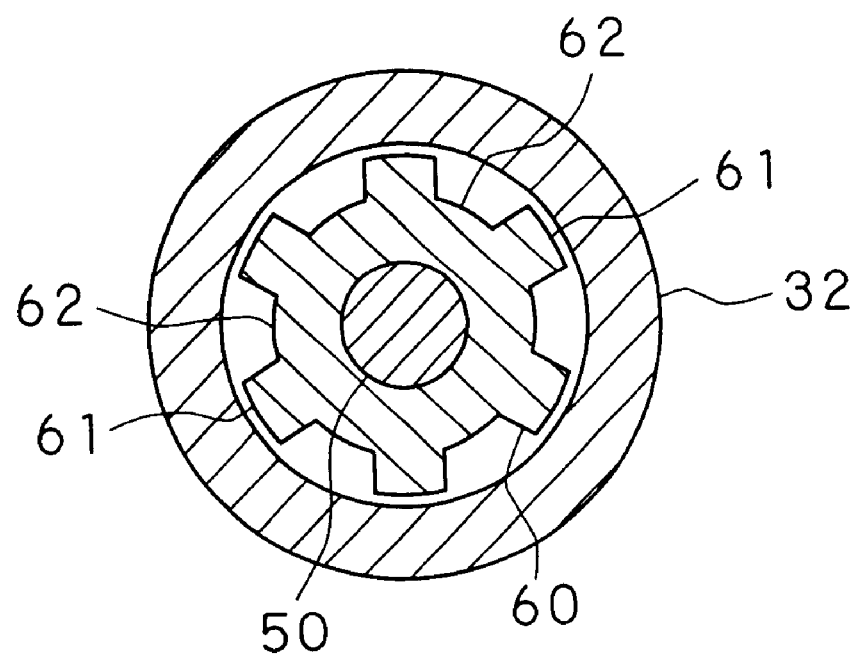
FIG. 3 is a vertical sectional view of a nozzle, a needle, and a needle bearing of the FIG. 2 ejector.

The ejector 30 is provided in a flow conduit which connects together the fuel supply side pressure control section 18 and the moisturizing section 13. Although the structure of this ejector 30 will be described in detail hereinafter, as shown in FIGS. 1 and 2, the fuel supply side pressure control section is connected to a nozzle 32 of this ejector 30, and the moisturizing section 13 is connected to a hydrogen outlet 37 of said ejector 30. And exhaust fuel which is exhausted from the fuel exhaust apertures 20d of the fuel cells 11, after the water therein has been removed by the water separation section 16, is supplied via a non-return valve 23 to a hydrogen recirculation inlet 36 of the ejector 30. The ejector 30 mixes fuel which has been supplied from the fuel supply side pressure control section 18 with the exhaust fuel which has been exhausted from the fuel cell 11 and supplies the resulting mixture to the fuel cells 11.

The fuel supply side pressure control section 18 consists of, for example, an air type proportional pressure control valve, and, by taking the pressure of the air which is supplied from the oxidizer supply section 14 as a signal pressure, it sets the pressure of the fuel which has passed through said fuel supply side pressure control section 18 and is present at the outlet of said fuel supply side pressure control section 18, in other words the fuel supply pressure, to a predetermined pressure value.

Next, the ejector 30 will be explained with reference to FIG. 2. This ejector 30 is mainly comprised of a diffuser 31, a nozzle 32, a needle 33, and a drive section 34.

In the interior of the diffuser 31 there is provided a bent fluid conduit 35 shaped roughly like a letter "U", and one end of this fluid conduit 35 opens to the external surface of the diffuser 31 as a hydrogen recirculation inlet 36, while its other end opens to the external surface of the diffuser 31 as a hydrogen outlet 37. A first conduit 38 which leads to the hydrogen recirculation inlet 36 and a second conduit 39 which leads to the hydrogen outlet 37 are arranged to extend mutually in parallel, and these two conduits 38 and 39 are connected together by a third conduit 40 which is roughly perpendicular to them both.

At an intermediate region along this third conduit 40 there is formed a constricted throat portion 41 thereof whose internal diameter is minimal, and the portion of the third conduit 40 upstream of this constricted throat portion 41 constitutes a reducing diameter throttle portion 42 whose internal diameter gradually and continuously reduces along the downstream direction (rightwards in FIG. 2), while the portion of said third conduit 40 downstream of the constricted throat portion 41 further constitutes an increasing diameter portion 43 whose internal diameter gradually and continuously increases along the downstream direction. It should be understood that the diverging angle of this increasing diameter portion 43 on the downstream side of the throat portion 41 is smaller than the converging angle of the throttle portion 42 on the upstream side thereof.

The nozzle 32 is formed in a tubular shape having apertures at both its ends, and it is arranged so that its central axis is coaxial with that of the third conduit 40 of the diffuser 31 by being fixed in the diffuser 31 so as to pierce through the wall portion thereof, with its inner aperture portion 44 at its tip end being positioned in the third conduit 40 at a position exactly a predetermined distance upstream of the throat portion 41 thereof.

The needle 33 is arranged so that its central axis is coaxial with the common central axis of the third conduit 40 of the diffuser 31 and the nozzle 32, and it is supported so as to be shiftable along its axial direction by a drive section 34. The drive section 34 comprises a linear drive type step motor and is fixed upon the outer end surface of the diffuser 31 in the vicinity of the second conduit 39, and a movable drive shaft 45 of this drive section 34 slides through a shaft bearing portion 47 of a fixing flange 46 which is fixed to said outer end surface of the diffuser 31, so that its end projects within the third conduit 40. The base end of the needle 33 is fixed upon the end of this movable shaft 45. It should be understood that a seal is provided between the diffuser 31 and the fixing flange 46 by a seal member 48, and the shaft bearing portion 47 of the fixing flange 46 is covered over and sealed by a diaphragm 49 which is housed in the drive section 34.

The tip portion of the needle 33 is formed as a straight portion 50, and a first taper section 51 is connected to the base end of this straight portion 50, with a second taper section 52 being connected to the base end of this first taper section 51. The outer diameter of the straight portion 50 is constant along its length, while the outer diameters of both the first taper section 51 and the second taper section 52 both gradually and continuously increase along their lengths in the direction of their base ends (rightwards in FIG. 2). The straight portion 50 of this needle 33 enters into the nozzle 32 from the aperture portion 44 of this nozzle 32, and is slidably supported by a needle bearing 60 which is interposed between the internal surface of the nozzle 32 and the outer surface of the straight portion 50. As shown in the sectional view shown in FIG. 3, this needle bearing 60 is formed with alternating convex portions 61 and concave portions 62 upon its outer peripheral surface, and the hydrogen fuel is able to pass along the concave portions 62. And the needle 33 is positioned so that, along with its first taper section 51 being located within the throttle portion 42 of the diffuser 31, a gap is present between it and the aperture portion 44 of the nozzle 32, and moreover so that its second taper section 52 is located within the increasing diameter portion of the diffuser 31. And a first fluid conduit 53 is constituted by the gap between the needle 33 and the aperture portion 44 of the nozzle 32, while a second fluid conduit is constituted by the gap between the needle 33 and the increasing diameter portion 43 of the diffuser 31.

And hydrogen is supplied as fuel to the nozzle 32 via the fuel supply side pressure control section 18, while moreover recirculated hydrogen, which is exhaust fuel which has been exhausted from the fuel cell 11, is supplied to the first conduit 38 of the diffuser 31.

Figure 4:
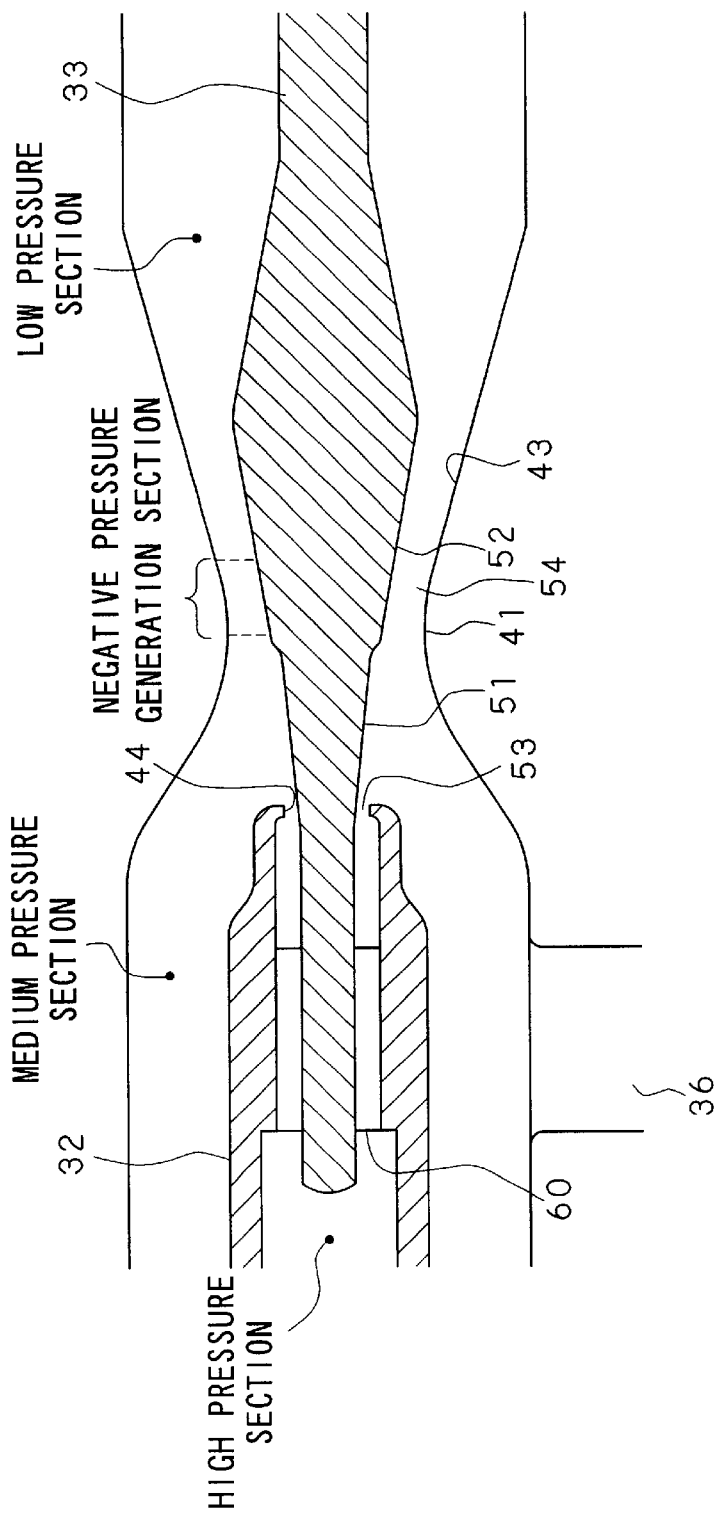
FIG. 4 is a sectional view showing a negative pressure generation section of this ejector.

With this ejector 30, when hydrogen is supplied to the nozzle 32 and recirculated hydrogen is supplied to the first conduit 38 of the diffuser 31, hydrogen which has been injected from the first fluid conduit 53 flows through the second fluid conduit 54 into the second conduit 39, and at this time a negative pressure is generated in the second fluid conduit 54 at the throat portion 41 and somewhat downstream thereof. Due to this negative pressure, the recirculated hydrogen in the first conduit 38 is sucked into the second fluid conduit 54, and mixes with the hydrogen which is injected from the first fluid conduit 53 and then flows into the second conduit 39. FIG. 4 roughly shows the pressure distribution at this time, and it is possible to check from this figure that a negative pressure is generated within the throat portion 41 and somewhat downstream thereof. It should be noted that the mixed hydrogen and recirculated hydrogen are expelled from the hydrogen outlet 37, and are then supplied to the fuel cells 11 via the moisturizing section 13.

Further, with this ejector 30, when the first taper section 51 and the second taper section of the needle 33 and the increasing diameter portion 43 of the diffuser 31 are formed to have shapes predetermined in advance, it is possible continuously to vary the aperture area of the first fluid conduit 53 and the aperture area of the second fluid conduit 54 by shifting the needle 33 in the downstream direction (the rightward direction in FIG. 2) from its initial position. Thus, with the ejector 30 of this first preferred embodiment, the shapes of the increasing diameter portion 43 of the diffuser 31 and of the first taper section 51 and the second taper section of the needle 33 are determined as follows.

Figure 21:
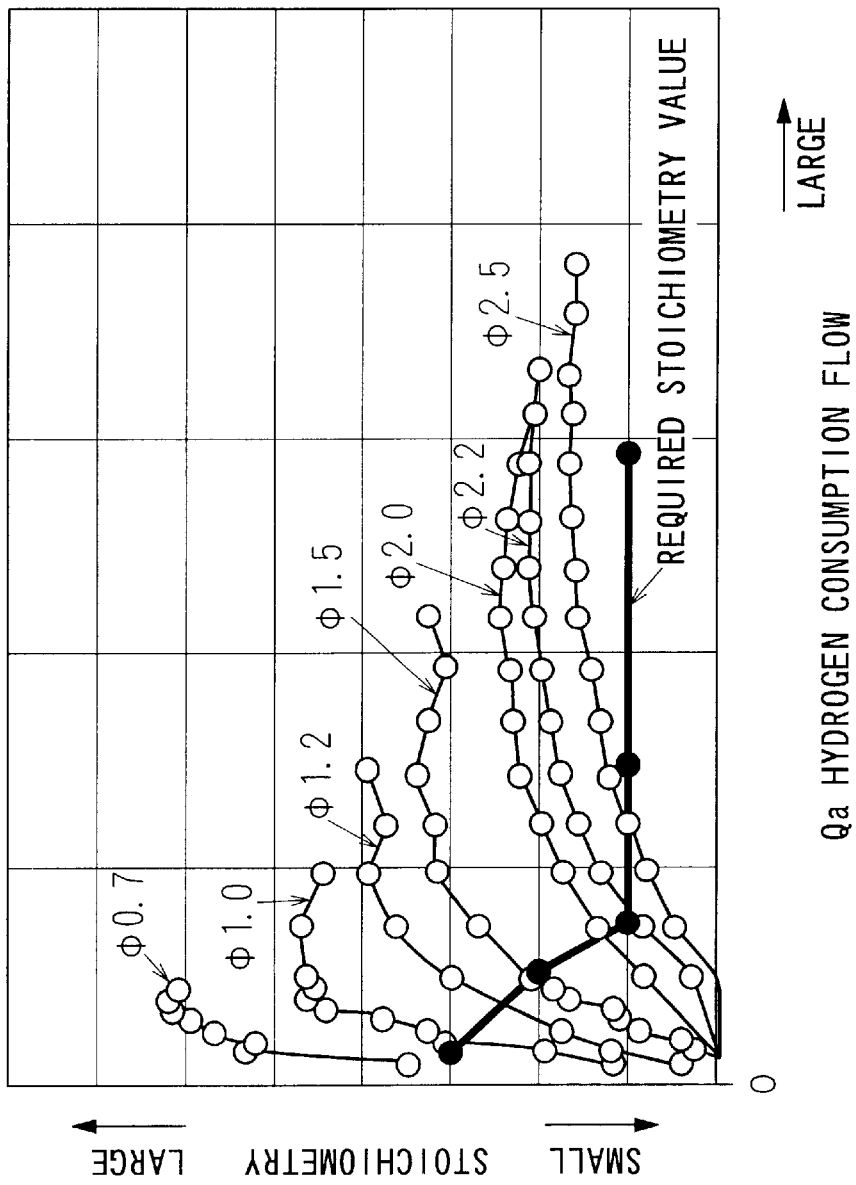
FIG. 21 is a figure showing, for this prior art ejector, the relationship between the value of stoichiometry and hydrogen consumption flow, for various values of nozzle diameter.

First, in the case that this is a fuel cell which is mounted to an electric automobile, since as previously described the stoichiometry value which is demanded according to the operational conditions of the fuel cell (the required stoichiometry value) is determined as shown by the thick solid line in FIG. 21, therefore it is necessary to determine the shape of the first taper section 51 so as to obtain an aperture area for the first fluid conduit 53 which can provide almost the required stoichiometry value corresponding to each flow.

The stoichiometry is defined as being the ratio (Qt/Qa) of the flow Qt of the hydrogen which flows out from the hydrogen outlet 37 of the diffuser 31 (in other words the total flow of the hydrogen supply which is provided to the fuel cell) to the flow Qa of the hydrogen which is ejected from the first fluid conduit 53 (in other words, the hydrogen consumption flow). Furthermore, if the flow of recirculated hydrogen which is sucked into the second fluid conduit 54 from the first conduit 38 is termed Qb, then, since Qt=Qa+Qb, the stoichiometry may be defines as (Qa+Qb)/Qa.

Figure 5:
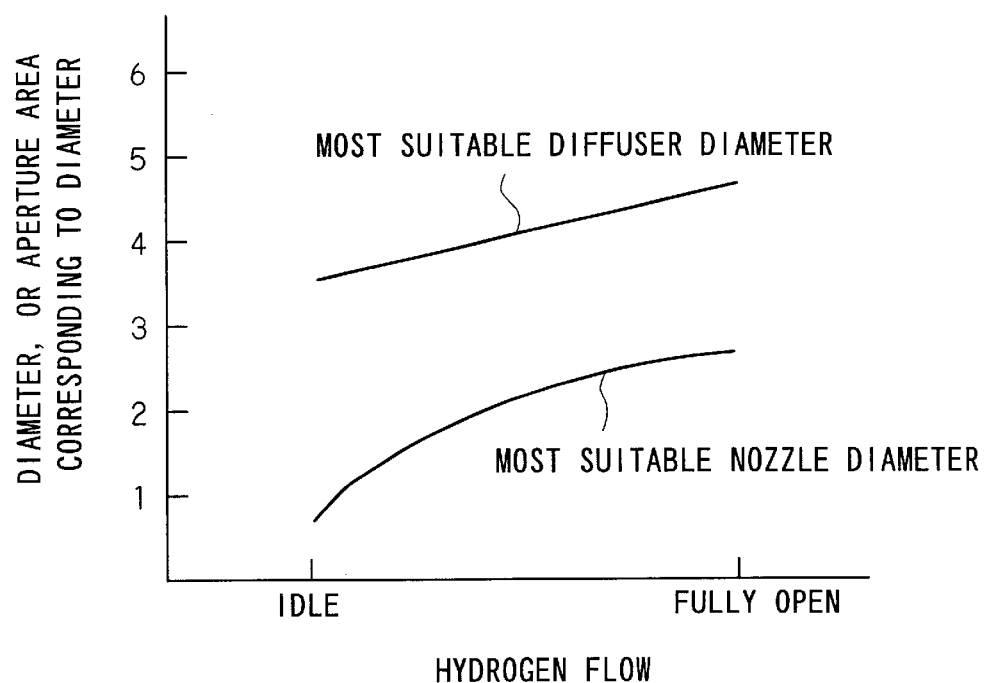
FIG. 5 is a figure showing, for said ejector, the relationships of the most suitable nozzle diameter and the most suitable diffuser diameter to hydrogen flow.

Furthermore, in order to approximate to the characteristic of the required stoichiometry value and of the flow shown by the solid line in FIG. 21, the present inventors have checked by experiment that it is desirable, as the aperture area of the first fluid conduit is made larger, to increase the aperture area of the second fluid conduit 54 as well, as shown in FIG. 5. Thus, based upon these experimental results, by shifting the needle 33 in the axial direction, the shapes of the increasing diameter portion 43 of the diffuser 31 and of the second taper section 52 of the needle 33 are determined so that the variation of the aperture area of the first fluid conduit 53 varies according to the most suitable nozzle diameter shown in FIG. 5, and the variation of the aperture area of the second fluid conduit 54 varies according to the most suitable diffuser diameter shown in FIG. 5.

Figure 19:
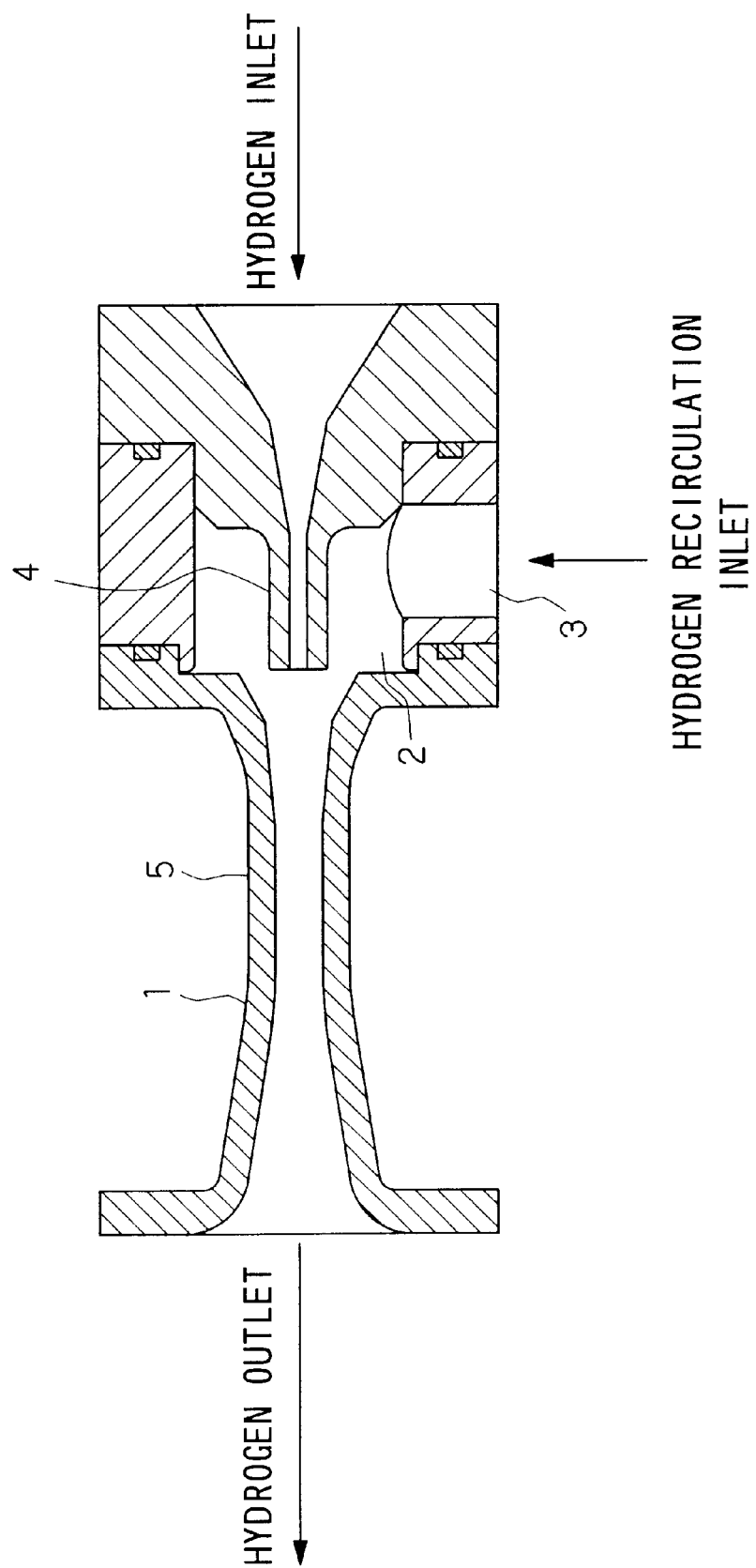
FIG. 19 is a sectional view of a conventional ejector according to a prior art.
Figure 20:
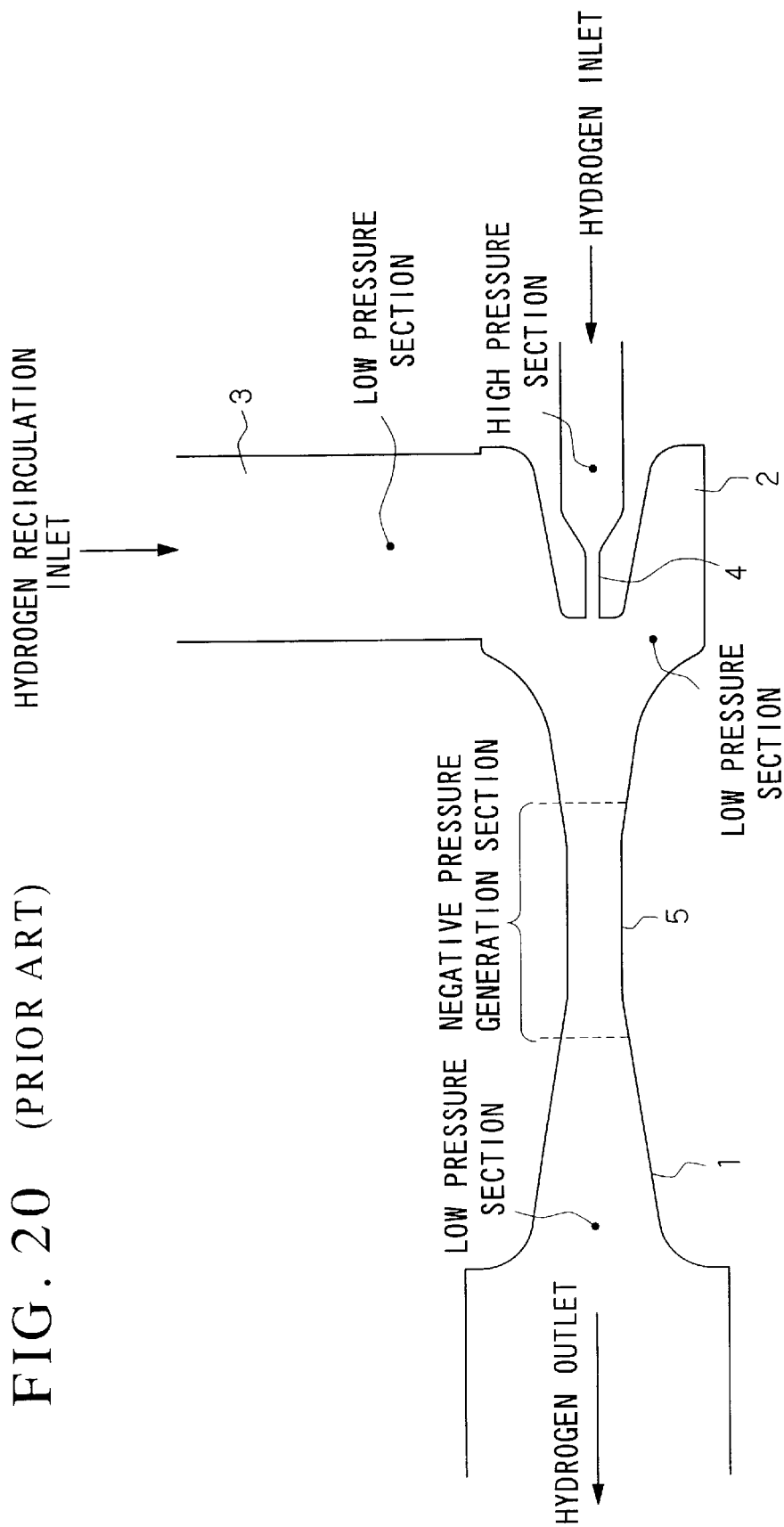
FIG. 20 is a figure showing a negative pressure generation section in this prior art ejector.

It should be understood that it is desirable to make the manner of variation of the aperture area of the second fluid conduit 54 to be generally similar to the manner of variation of the aperture area of the most suitable diverging angle (8° to 10°) of a diffuser in an ejector of the type in which the diffuser diameter and the nozzle diameter are fixed (in other words, an ejector of a type corresponding to FIG. 19), or to make it greater by a certain proportion, in consideration of the proportionate increase of the wall surface resistance.

According to the fuel supply system for a fuel cell incorporating this ejector 30, it is possible continuously to vary the aperture areas of both the first fluid conduit 53 and the second fluid conduit 54 simultaneously by approaching the needle 33 along its axial direction to the nozzle 32 via the drive section 34 or increasing its distance therefrom; and moreover when the fuel flow is a small one it is possible to make the aperture areas of both the first fluid conduit 53 and the second fluid conduit 54 small, while when the fuel flow is a large one it is possible to make the aperture areas of both the first fluid conduit 53 and the second fluid conduit 54 large.

Figure 6:
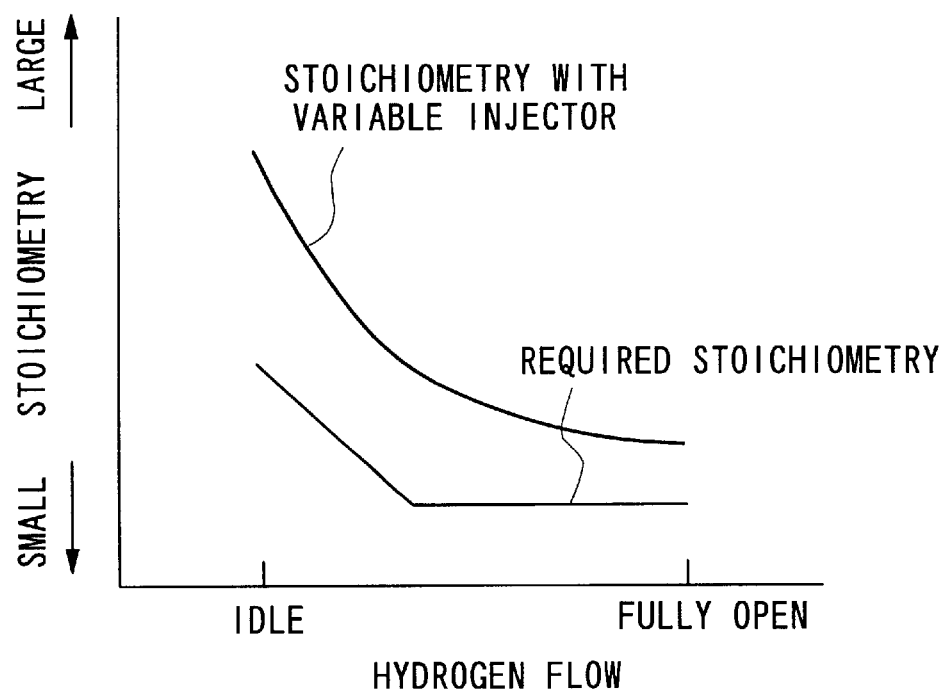
FIG. 6 is a graph showing the stoichiometry characteristic of this ejector.

And, by controlling the drive section 34 according to the operational state of the fuel cell 1, it is possible to supply the necessary flow of fuel to the fuel cell 1 while ensuring the stoichiometry characteristic over a wide range of fuel flow from a low flow to a high flow. FIG. 6 is an stoichiometry characteristic graph showing stoichiometry value along the vertical axis and hydrogen flow along the horizontal axis, and it is possible to check from this figure that the stoichiometry characteristic of this ejector 30 varies approximately as the required stoichiometry characteristic.

Furthermore, since it is possible to obtain the above described beneficial effects simply by shifting the needle 33 in its axial direction, thereby it is possible to achieve simplification of the structure of the ejector and reduction in its size and weight.

It should be noted that, although with the above described first preferred embodiment of this invention the nozzle 32 was fixed in the body of the diffuser 31, it would also be possible for the nozzle 32 to be engaged in the body of the diffuser 31 by a screw thread, so that the position of the nozzle 32 could be adjusted along its axial direction. If this is done, by performing adjustment of the position of the nozzle 32, it is possible to absorb variations of manufacturing accuracy of the dimensional clearances of the aperture portion 44 of the nozzle 32 and the throat portion 41 of the diffuser 31, and to absorb variations in practice between various vehicles in the required flow characteristics.

Figure 7:
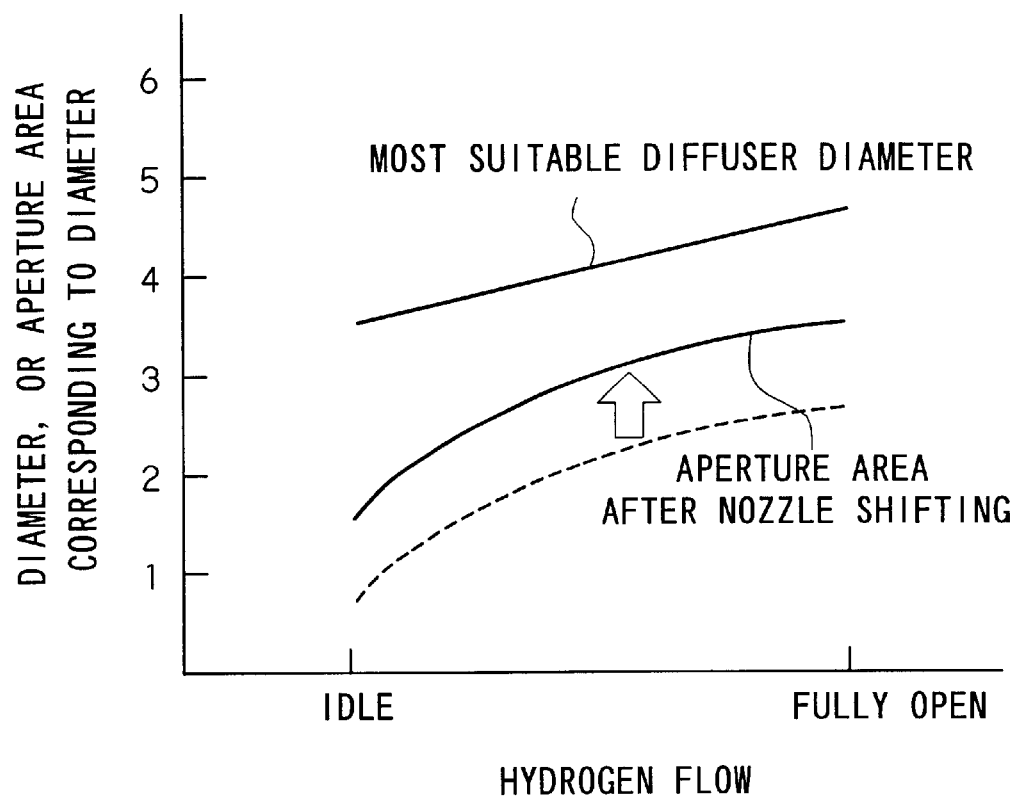
FIG. 7 is a figure showing, for this ejector, the variation of the ratio of the aperture areas of a first fluid conduit and a second fluid conduit as the position of the nozzle is adjusted.

Furthermore, it is possible to adjust the initial aperture area of the second fluid conduit 54 by adjusting the position of the nozzle 32 along its axial direction. Accordingly, as shown in FIG. 7 which is an aperture area ratio variation figure, it is possible to perform minute adjustment of the aperture area ratio between the aperture area of the first fluid conduit 53 (the aperture area of the nozzle 32) and the aperture area of the second fluid conduit 54 (the aperture area of the diffuser 31).

Figure 8:
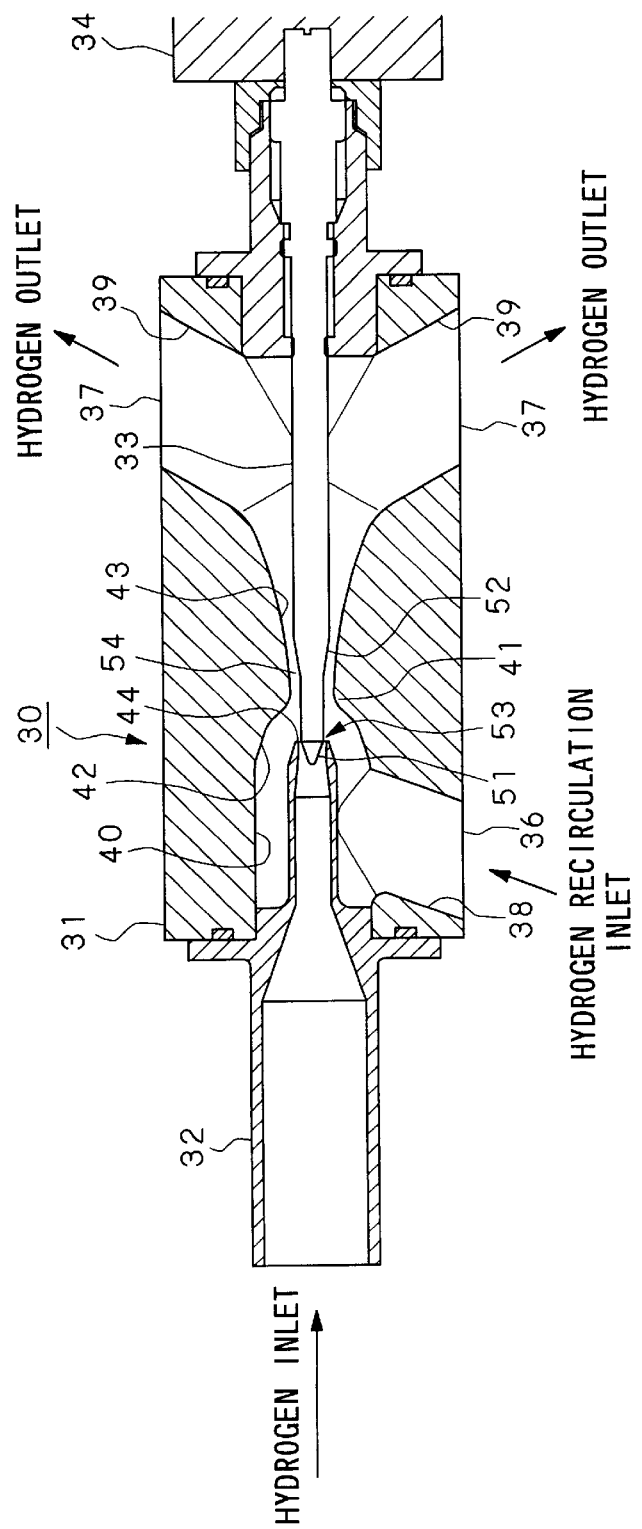
FIG. 8 is a sectional view of a variant of this first preferred embodiment ejector.

FIG. 8 is a figure showing a variant example of the ejector 30. In the ejector 30 of the first preferred embodiment described above the first conduit 38 and the second conduit 39 of the diffuser 31 are provided as perpendicular to the third conduit 40, and, with the fluid conduit 35 structured in this manner, the flow resistance is undesirably increased because of the sudden changes of direction of fluid flow.

Thus, in this variant example, along with the first conduit 38 and the second conduit 39 being both connected to the third conduit at oblique angles, the second conduit 39 is provided as a pair of conduits, and accordingly the flow resistance is reduced. Apart from these features, the structure of the ejector 30 of this variant example is the same as that of the ejector 30 of the first preferred embodiment described above, and therefore to elements of this variant example which correspond to elements of the first preferred embodiment described above the same reference symbols are appended, and the description thereof will be curtailed.

Moreover, the present invention is not to be considered as being limited by any of the perhaps purely fortuitous details of the above described embodiment. For example, the drive section 34 is not limited to being a linear drive type step motor, and it is possible to utilize other drive device for the needle 33, provided that such device is capable of performing adjustment of the position of the needle 33 along its axial direction.

Furthermore, although in the above described first preferred embodiment the taper sections were formed integrally with the needle, this is not to be considered as being limitative of the present invention; the taper sections may alternatively be separate elements from the needle. In this case, a taper section position adjustment device which shifts the taper section or sections along the axial direction may be provided separately from the needle position adjustment device, and thereby their positions may be adjusted independently of one another.

Embodiment 2

Figure 9:
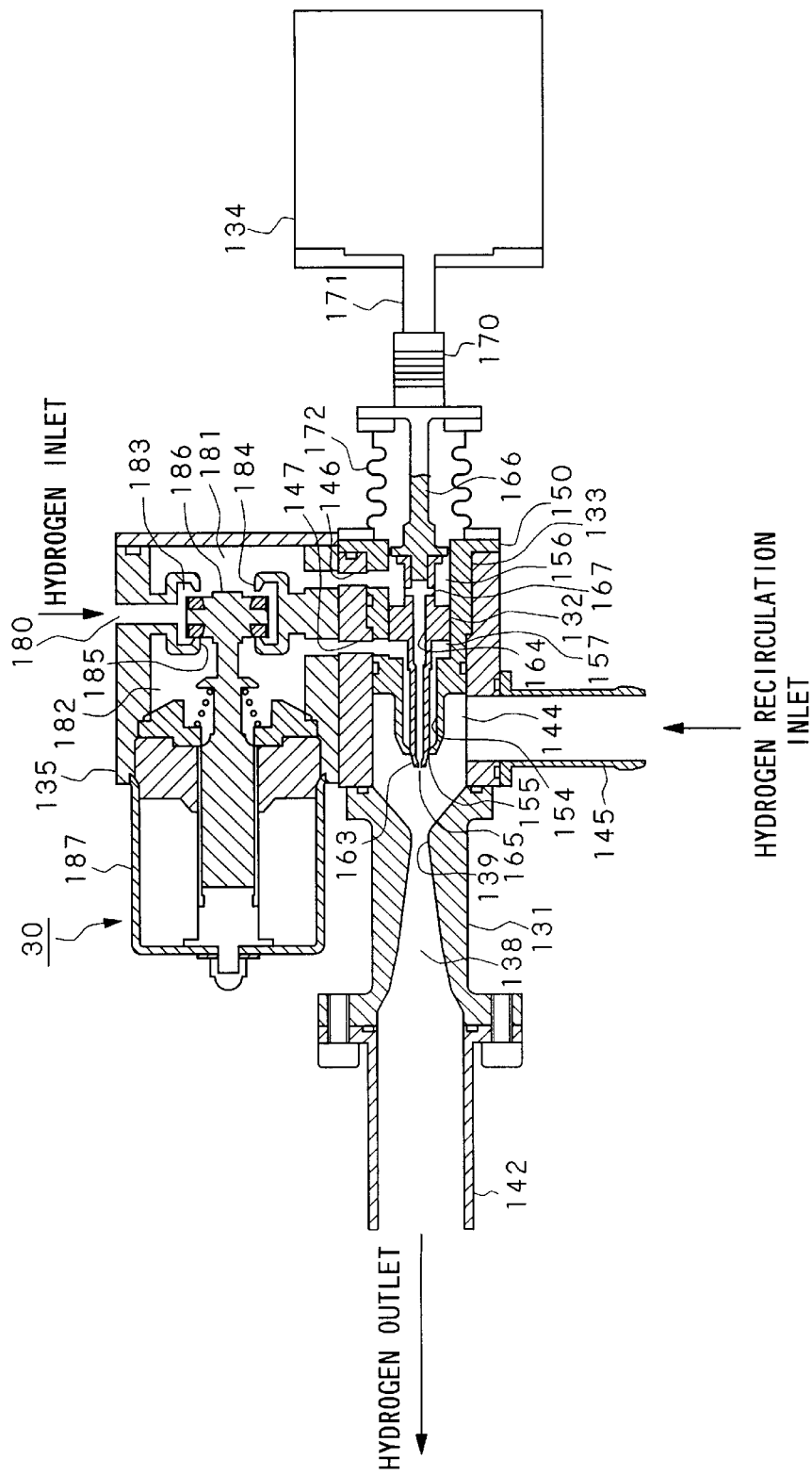
FIG. 9 is a sectional view of an ejector which is a second preferred embodiment of the fluid supply device for a fuel cell according to the present invention.

FIG. 9 shows an ejector 30 of a second preferred embodiment of the present invention. The ejector 30 of this second preferred embodiment can also be used in, for example, the fuel supply system of FIG. 1. In this case, the fuel supply side pressure control section 18 is connected to a hydrogen inlet 180 of the ejector 30, while the moisturizing section 13 is connected to a hydrogen outlet tube 142 of the ejector 30. Exhaust fuel which is exhausted from the fuel exhaust apertures 20d of the fuel cells 11, after water has been removed therefrom by the water separator section 16, is supplied via a non-return valve 23 to a hydrogen recirculation inlet tube 145 of the ejector 30. The ejector 30 mixes together fuel which has been supplied from the fuel supply side pressure control section 18 and exhaust fuel which has been exhausted from the fuel cell 11 and supplies the result to the fuel cells 11.

Figure 10:
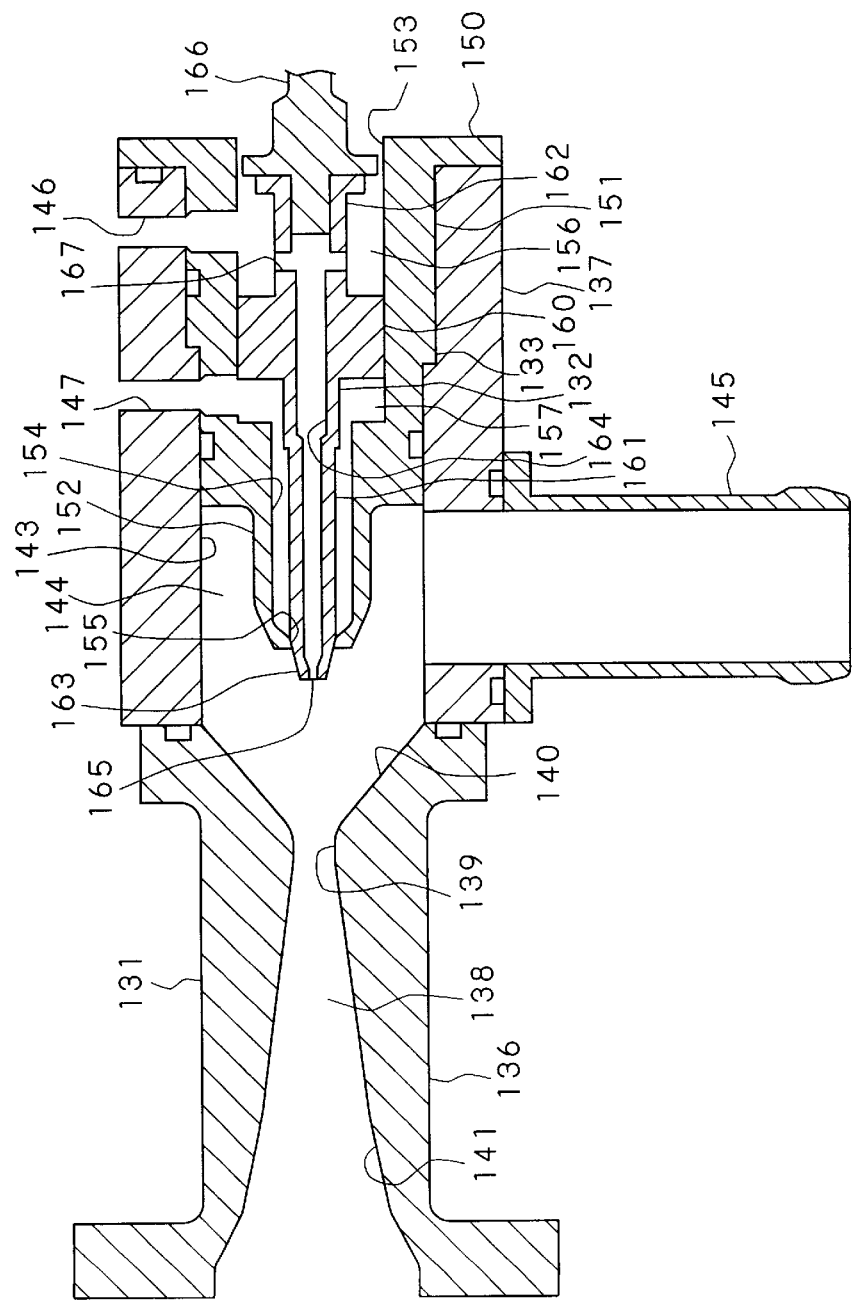
FIG. 10 is a magnified sectional view of the essential portions of this second preferred embodiment ejector.

FIG. 9 is a sectional view of the ejector 30 as a whole, while FIG. 10 is a sectional view showing essential portions thereof magnified. This ejector 30 principally comprises a diffuser 131, a second nozzle 132, a first nozzle 133, a drive section 134, and a changeover valve 135.

The diffuser 131 consists of a first block 136 positioned on the downstream side and a second block positioned on the upstream side which are coaxially connected together, and a fluid conduit 138 is formed to pierce through the first block 136 in the axial direction. At an intermediate point the fluid conduit 138 has a throat portion 139 at which the internal diameter is at a minimum, and upstream of this throat portion 139 a throttle portion 140 is provided which gradually and continuously shrinks down in the downstream direction, while downstream of this throat portion 139 an increasing diameter portion 141 is provided which gradually and continuously increases in diameter in the downstream direction. The angle of divergence of this downstream increasing diameter portion 141 is smaller than the angle of divergence of the upstream throttle portion 140. It should be understood that in FIG. 9 and FIG. 10 the left side is the downstream side, while the right side is the upstream side. The downstream side end portion of the first block 136 is connected to the hydrogen outlet tube 142.

A through hole 143 is provided pierced through the second block 137 along its axial direction, and the downstream end of this through hole 143 is connected to the throttle portion 140 of the first block 136. The first nozzle 133 is fixedly inserted into the through hole 143 in the second block 137 from its upstream end aperture.

The first nozzle 133 comprises a flange portion 150 which is fixed to the upstream end portion of the second block 137 with a seal being formed therebetween, a large diameter portion 151 which is fitted into the through hole 143 of the second block 137 so as to continue in the downstream direction from this flange portion 150, and a small diameter portion 152 which continues in the downstream direction from this large diameter portion 151. Furthermore, the first nozzle 133 comprises a large diameter hole 153 which opens to the flange portion 150 and a small diameter hole 154 which is connected to this large diameter hole 153 and extends to the downstream side thereof, and the small diameter hole 154 leads to an aperture portion 155 which opens at the downstream side end surface of the first nozzle 133.

An empty space in the through hole 143 of the second block 137 on the downstream side of the first nozzle 133 constitutes a recirculation chamber 144, and a hydrogen recirculation inlet tube 145 which supplies recirculated hydrogen is connected to this recirculation chamber 144 in the second block 137.

The second nozzle 132 is inserted into the interior of the first nozzle 133. In the second nozzle 132 there are provided a large diameter portion 160 which can slide along its axial direction in the large diameter hole 153 of the first nozzle 133 while maintaining a seal against it, a downstream small diameter portion 161 which extends from this large diameter portion 160 along the axial direction to the downstream side, and an upstream small diameter portion 162 which extends from the large diameter portion 160 along the axial direction to the upstream side. At the end portion of the downstream side small diameter portion 161, there is formed a taper section 163 which gradually and continuously reduces in diameter with progress in the downstream direction, and this taper section 163 is inserted into the aperture portion 155 of the first nozzle 133.

Furthermore, a fluid conduit 164 is formed inside the second nozzle 132 to extend along its axial direction, and the downstream end of this fluid conduit 164 connects to the tip end surface of the second nozzle 132, in other words to an aperture portion 165 which opens at the tip end surface of the taper section 163, while the upstream end of this fluid conduit 164 is closed by a movable shaft 166 which is fixedly connected to the downstream end of the second nozzle 132. The large diameter portion 160 of the second nozzle 132 demarcates the upstream end of the first conduit 156 from the downstream side of the second conduit 157 within the large diameter hole 153 of the first nozzle 133. Furthermore, fluid conduits 167 are provided in the second nozzle 132 so as to connect together the fluid conduit 164 and the first conduit 156.

The fluid conduit 138 of the diffuser 131, the fluid conduit 164 and the aperture portion 165 of the second nozzle 132, and the small diameter hole 154 and the aperture portion 155 of the first nozzle 133 are arranged to be coaxial.

Furthermore, the second nozzle 132 is made to be capable of being shifted along its axial direction, and by thus shifting the second nozzle 132 along its axial direction, not only is it possible to open and close the aperture portion 155 of the first nozzle 133 by the taper section 163 of the second nozzle 132, but also it is possible to vary the aperture area of the gap between the aperture portion 155 of the first nozzle 133 and the taper section 163 of the second nozzle 132.

A movable shaft 166 which is connected to the second nozzle 132 is connected to an output shaft 171 of a drive section 134 via a coupling 170, and the second nozzle 132 is shifted along its axial direction by this drive section 134. Furthermore, the drive section 134 may for example be constituted as a linear drive type step motor, and is controlled in a predetermined manner based upon the output current of the fuel cell 11.

Sealing between the second nozzle 132 and the movable shaft 166 is performed by a seal member 172 which is provided with a metallic bellows.

Fluid conduits 146 and 147 are provided in the second block 137 of the diffuser 131 and the first nozzle 133 which are connected to the first conduit 156 and the second conduit 157 respectively, and these fluid conduits 146 and 147 are connected to a changeover valve 135. The shift range of the second nozzle 132 is limited to be within the range in which the first conduit 156 is always connected to the fluid conduit 146 and the second conduit 157 is always connected to the fluid conduit 147.

The changeover valve 135 comprises a first chamber 181 which is connected to the fluid conduit 146, a second chamber 182 which is connected to the fluid conduit 147, and a valve chamber 183 which is connected to a hydrogen inlet 180 which is provided between the first chamber 181 and the second chamber 182; and a ring shaped first valve seat 184 is provided at an aperture portion which connects the first chamber 181 and the valve chamber 183, while a ring shaped second valve seat 185 is provided an an aperture portion which connects the second chamber 182 and the valve chamber 183. This first valve seat 184 and second valve seat 185 are arranged so as to oppose one another, and a valve body 186 is provided between these two valve seats 184 and 185. The valve body 186 is arranged to be shiftable by an electromagnetic actuator 187, and can either be pressed against or shifted away from the first valve seat 184 and the second valve seat 185. When the valve body 186 is pressed against the first valve seat 184, the valve chamber 183 and the second chamber 182 are communicated together while the valve chamber 183 and the first chamber 181 are isolated from one another; whereas, when the valve body 186 is pressed against the second valve seat 185, the valve chamber 183 and the first chamber 181 are communicated together while the valve chamber 183 and the second chamber 182 are isolated from one another.

With this ejector 30, when recirculated hydrogen is supplied to the recirculation chamber 144 of the diffuser 131 from the hydrogen recirculation inlet tube 145, and hydrogen is supplied to the hydrogen inlet 180 of the changeover valve 135, and hydrogen is injected from the aperture portion 165 of the second nozzle 132 or from the gap between the aperture portion 155 of the first nozzle 133 and the taper section 163 of the second nozzle 132, then the injected hydrogen flows into the fluid conduit 132 of the diffuser 131, and at this time a negative pressure is generated in the vicinity of the throat portion 139, and recirculated hydrogen in the recirculation chamber 144 is sucked into the fluid conduit 138 by this negative pressure, and mixes with the hydrogen which has been injected from the second nozzle 132 or the first nozzle 133, to flow to the hydrogen outlet tube 142. It should be noted that the mixed hydrogen and recirculated hydrogen are then supplied from the hydrogen outlet tube 142 to the fuel cells 11 via the moisturizing section 13.

Next the operation of this ejector 30 will be explained with reference to FIGS. 9 through 14A and 14B.

First, when the hydrogen flow which must be supplied to the fuel cells 11 is a small flow, then, as shown in FIG. 9 and FIG. 10, the valve body 186 of the changeover valve 135 is shifted so as to press against the second valve seat 185, and the second nozzle 132 is advanced by the drive section 134 to the downstream side so that the aperture portion 155 of the first nozzle 133 is closed by the taper section 163 (in the following discussion, the position of the second nozzle 132 at this time will be termed its initial position).

When this is done, the hydrogen which is supplied to the valve chamber 183 from the hydrogen inlet 180 of the changeover valve 135 flows from the valve chamber 183 into the first chamber 181, and moreover flows into the first conduit 156 of the first nozzle 133 via the fluid conduit 146, flows from this first conduit 156 into the fluid conduit 164 of the second nozzle 132 via the fluid conduit 167, and is injected from the aperture portion 165 of the second nozzle 132 into the fluid conduit 138 of the diffuser 131. Due to this, a negative pressure is generated in the vicinity of the throat portion 139 of the diffuser 131, and recirculated hydrogen in the recirculation chamber 144 is sucked into the fluid conduit 138 by this negative pressure, and the mixed flow of hydrogen and recirculated hydrogen is outputted from the hydrogen outlet tube 142 to be supplied to the fuel cells 11. In this case, since the internal diameter of the aperture portion 165 of the second nozzle 132 is small (for example, this internal diameter may be 0.7 mm), therefore it is possible to obtain a high stoichiometry value for a small hydrogen flow, as shown in FIG. 6. It should be noted that, since at this time the second chamber 182 of the changeover valve 135 is cut off from the valve chamber 183 by the valve element 186, therefore no hydrogen is supplied to the second chamber 182.

In this preferred embodiment, by the stoichiometry is meant the ratio (Qt/Qa) of the hydrogen flow which is outputted from the hydrogen outlet tube 142 (in other words, the total flow of hydrogen which is supplied to the fuel cells) Qt, to the hydrogen flow which is ejected from the aperture portion 165 of the second nozzle 132, or the hydrogen flow which is injected from the gap between the aperture portion 155 of the first nozzle 133 and the taper section 163 of the second nozzle 132 (in other words, the hydrogen consumption flow) Qa. Furthermore, if the hydrogen recirculation flow which is sucked into the fluid conduit 138 from the recirculation chamber 144 is termed Qb, then, since Qt=Qa+Qb, the stoichiometry is defined as (Qa+Qb)/Qa.

Figure 11:
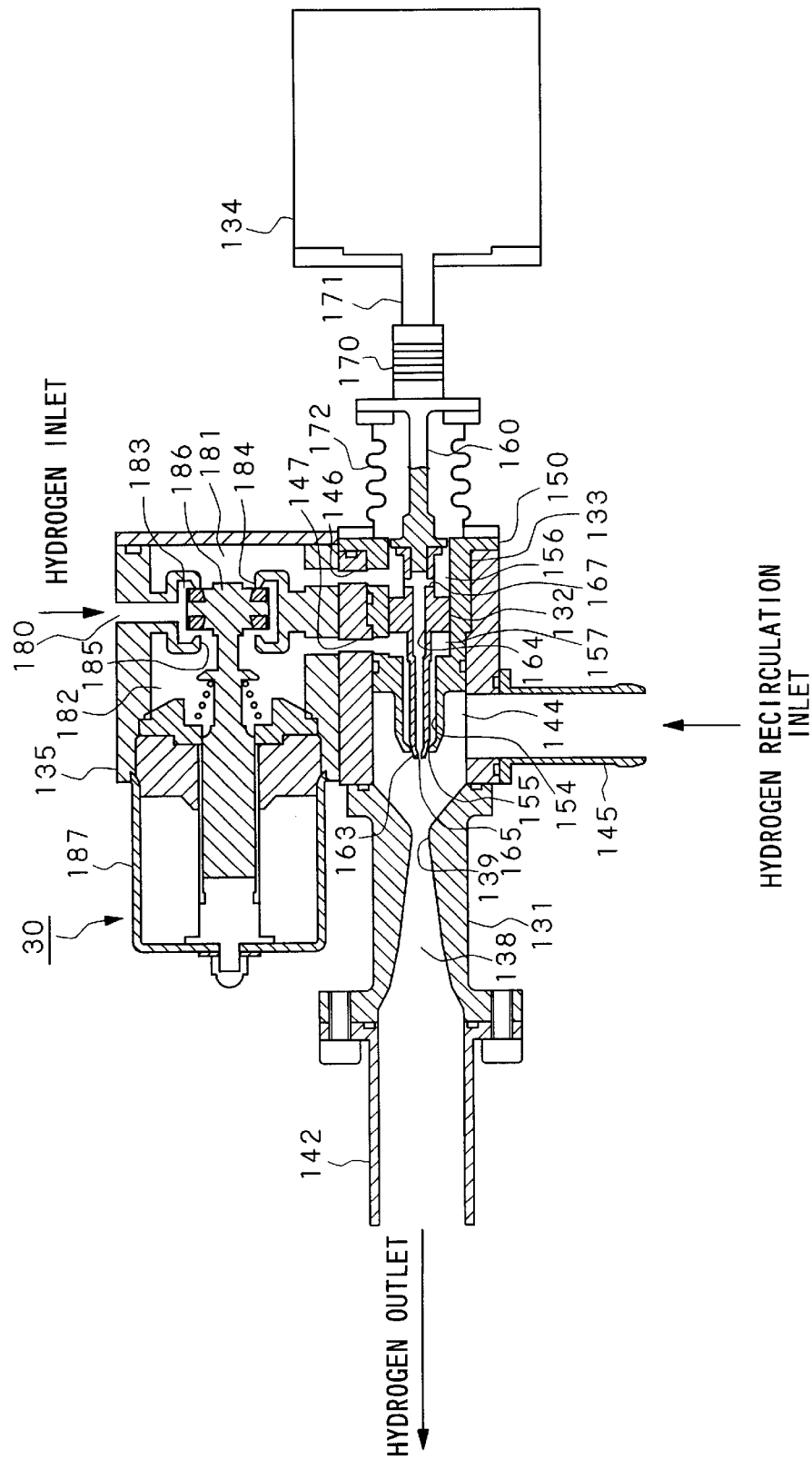
FIG. 11 is a sectional view showing the situation during medium flow operation of this second preferred embodiment ejector.

Next, when the hydrogen flow which must be supplied to the fuel cells 11 is a medium flow, then, as shown in FIG. 11, the valve body 186 of the changeover valve 135 is shifted so as to press against the first valve seat 184, and the second nozzle 132 is somewhat retracted by the drive section 134 to the upstream side, so that the taper section 163 is removed away from the aperture portion 155 of the first nozzle 133, and a gap appears between the aperture portion 155 and the taper section 163.

When this is done, hydrogen which is supplied to the valve chamber 183 from the hydrogen inlet 180 of the changeover valve 135 flows into the second chamber 182 from the valve chamber 183, and then flows to the second conduit 157 of the first nozzle 133 via the fluid conduit 147, flows from this second conduit 157 into the small diameter hole 154, and is injected into the fluid conduit 138 of the diffuser 131 from the gap between the aperture portion 155 of the first nozzle 133 and the taper section 163 of the second nozzle 132. Due to this, a negative pressure is generated in the vicinity of the throat portion 139 of the diffuser 131, and recirculated hydrogen in the recirculation chamber 144 is sucked into the fluid conduit 138 by this negative pressure, and the mixed together hydrogen and recirculated hydrogen are outputted from the hydrogen outlet tube 142 and supplied to the fuel cells 11. In this case, it is possible to obtain a specified stoichiometry value at medium flows by setting the aperture area of the gap between the aperture portion 155 and the taper section 163 to be greater than the aperture area of the aperture portion 165 of the second nozzle 132. It should be noted that, since at this time the first chamber 181 of the changeover valve 135 is cut off from the valve chamber 183 by the valve element 186, therefore no hydrogen is supplied to the first chamber 181. Accordingly, no hydrogen is injected from the aperture portion 165 of the second nozzle 132.

Figure 12:
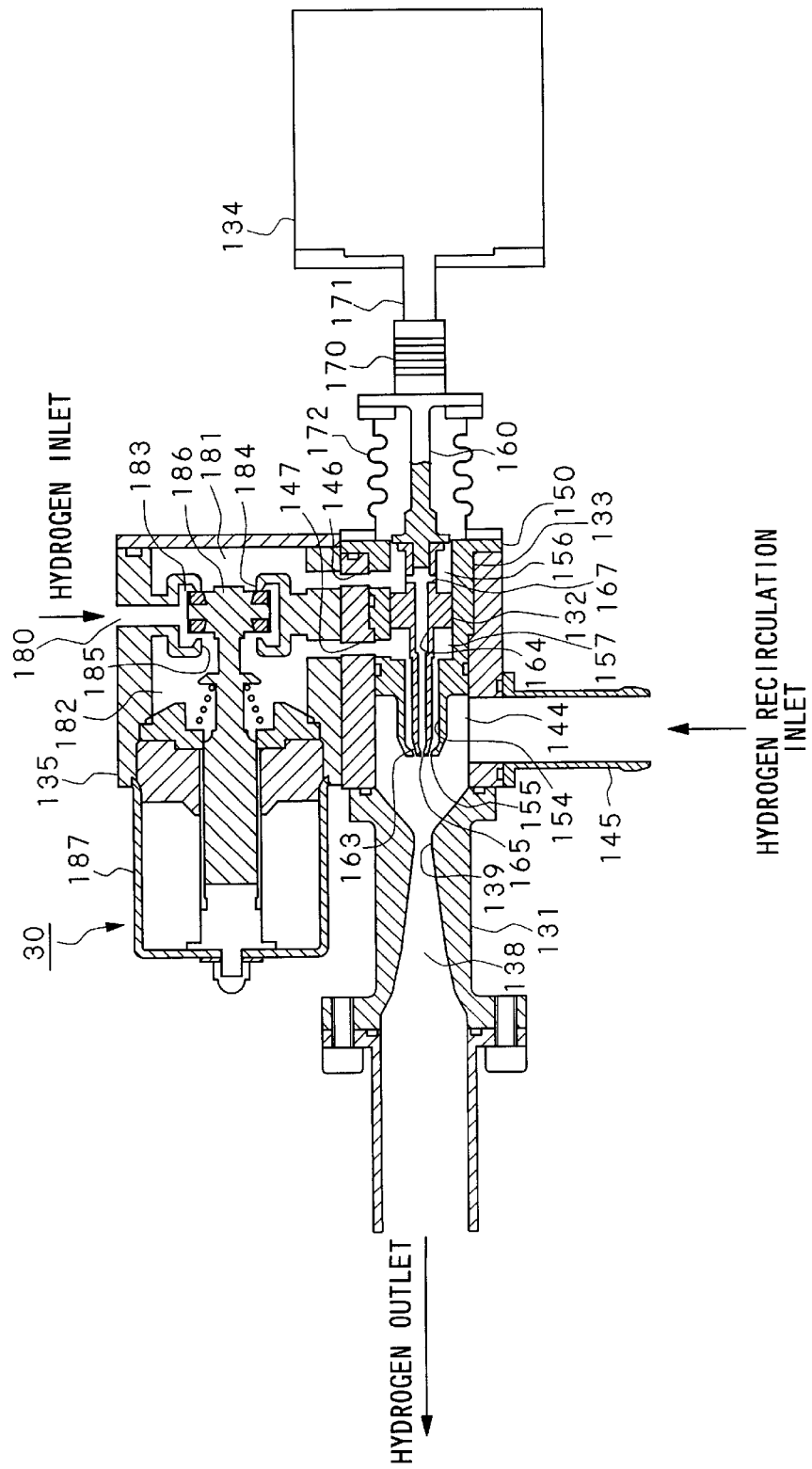
FIG. 12 is a sectional view showing the situation during high flow operation of this second preferred embodiment ejector.

Next, when the hydrogen flow which must be supplied to the fuel cells 11 is a large flow, then, as shown in FIG. 12, with the valve body 186 of the changeover valve 135 being maintained in its state of being pressed against the first valve seat 184, the second nozzle 132 is further retracted by the drive section 134 to the upstream side. When this is done, the aperture area of the gap between the aperture portion 155 of the first nozzle 133 and the taper section 163 of the second nozzle 132 is further enlarged, and the flow of the hydrogen which is injected from this gap can be increased. Due to this, it is possible to obtain a specified stoichiometry value at large flows.

It should be noted that, when the hydrogen flow is a medium flow or a large flow, the amount by which the second nozzle 132 is shifted from its initial position in the upstream direction, may be set so as to obtain an aperture area for the gap between the aperture portion 155 of the first nozzle 133 and the taper section 163 of the second nozzle 132 which corresponds to a nozzle diameter which can satisfy the required stoichiometry value in FIG. 21, or may be controlled by the drive section 134 according to the hydrogen flow which corresponds thereto. On the other hand, it is also possible to perform changeover control of the changeover valve 135 according to the hydrogen flow.

Incidentally, with this ejector 30, the reason that when the flow is small hydrogen is not injected from the gap between the aperture portion 155 of the first nozzle 133 and the taper section 163 of the second nozzle 132, but is only injected from the aperture portion 165 of the second nozzle 132, is as follows.

Figure 13:
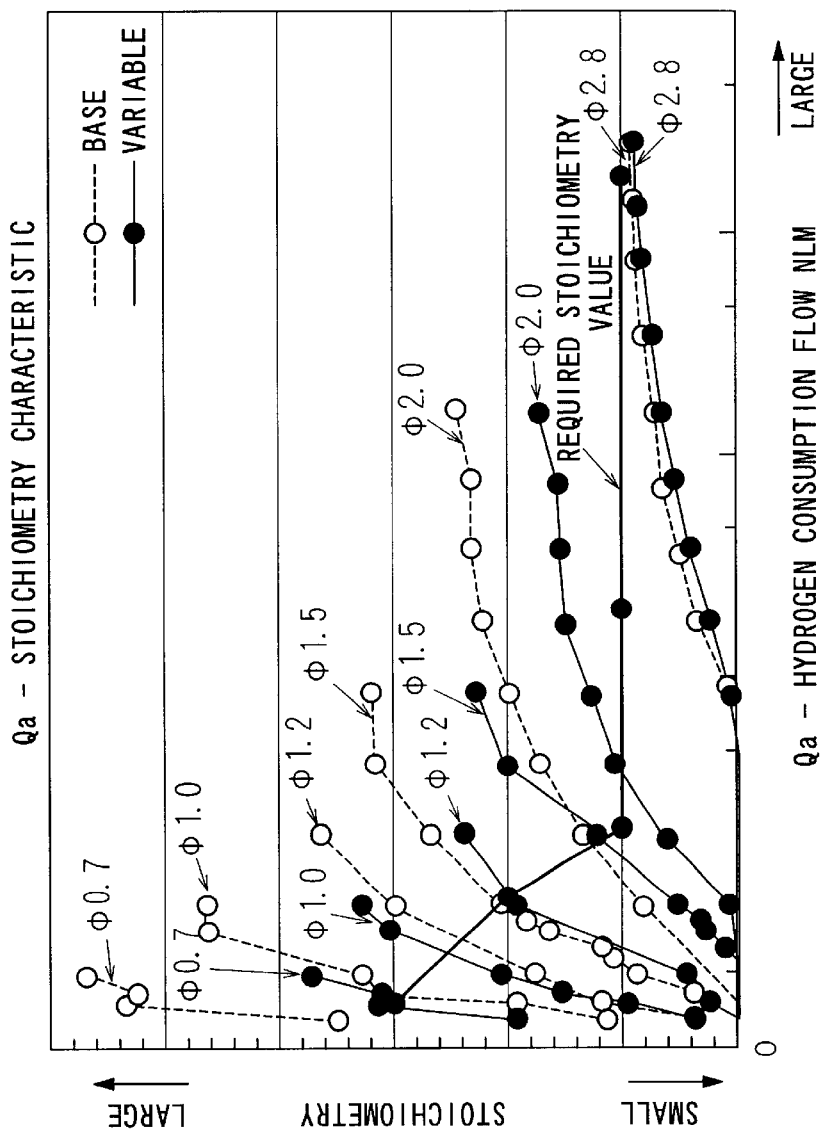
FIG. 13 is a comparison figure showing the stoichiometry characteristics of a non-variable flow ejector and a variable flow ejector.

FIG. 13 is a stoichiometry characteristic chart showing, for various values of aperture area as a parameter, the case when hydrogen is injected only from the aperture portion 165 of the second nozzle 132 (the broken lines in the figure) and the case when hydrogen is injected only from the gap between the aperture portion 155 of the first nozzle 133 and the taper section 163 of the second nozzle 132 (the solid lines in the figure).

Figure 14A:
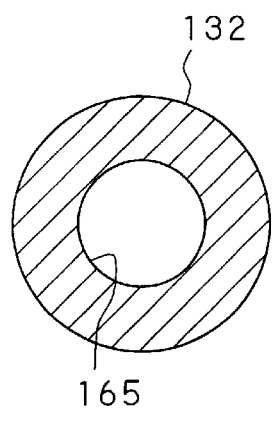
FIG. 14A is a sectional view of a first nozzle aperture portion of this second preferred embodiment.
Figure 14B:
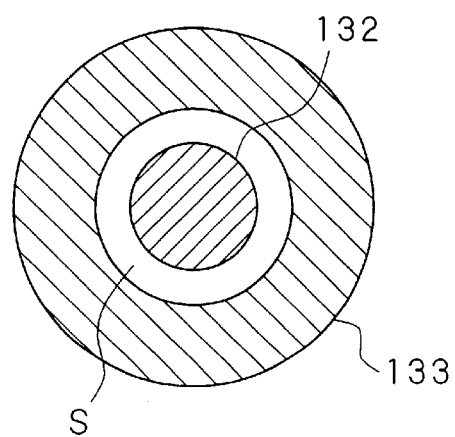
FIG. 14B is a sectional view of a second nozzle aperture portion thereof.

From this stoichiometry characteristic chart it will be understood that, when the aperture area is small (diameter 0.7 mm), then the stoichiometry value when hydrogen is only injected from the gap between the aperture portion 155 and the taper section 163 is greatly reduced below the stoichiometry value when hydrogen is injected only from the aperture portion 165 of the second nozzle 132, and drops below the required stoichiometry value. This is greatly influenced by the wall surface resistance of the aperture portion. FIG. 14A shows a cross section of the aperture portion 165 of the second nozzle 132, while FIG. 14B shows a cross section of the gap S between the aperture portion 155 and the taper section 163, and it will be clear that, if the aperture area is the same, the wall surface resistance in the case of FIG. 14A will be the lesser, while the wall surface resistance in the case of FIG. 14B will be the greater. The difference of these wall surface resistances is particularly conspicuous when the aperture area is small. Due to this, with this ejector 30, when the aperture area is to be made small for a small hydrogen flow, it is arranged only to inject hydrogen from the aperture portion 165 of the second nozzle 132, in order to be able to ensure the required stoichiometry value when the flow is small.

According to a fuel supply system for a fuel cell which includes this ejector 30, by changing over the flow path of the hydrogen by the changeover valve 135, and by adjusting the position of the second nozzle 132 along its axial direction by the drive section 134, it is possible to supply the required fuel flow to the fuel cells 11 while ensuring the specified stoichiometry characteristic over a wide range of flow from a small flow to a large flow. The stoichiometry characteristic chart for this ejector 30 is also as shown in FIG. 6, and the stoichiometry characteristic of the ejector 30 varies approximately as the required stoichiometry characteristic. Furthermore, the stoichiometry characteristic at small flows is also sufficiently satisfactory.

Embodiment 3

Figure 15:
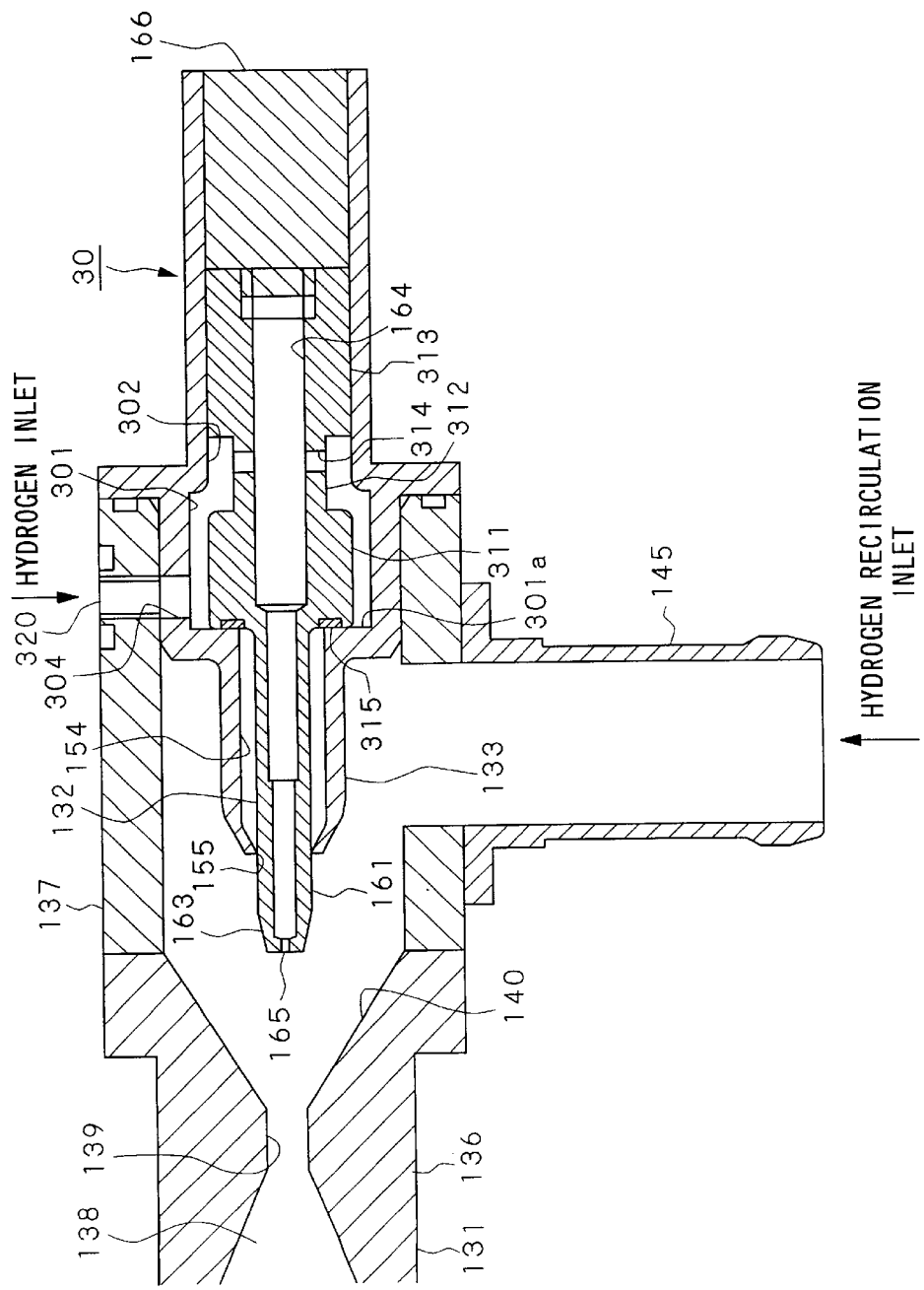
FIG. 15 is a sectional view of an ejector which is a third preferred embodiment of the fluid supply device for a fuel cell according to the present invention, and in particular shows the situation during low flow operation.

Next, a third preferred embodiment of the fluid supply device for a fuel cell according to the present invention will be described with reference to FIGS. 15 and 16.

The ejector 30 of the above described second preferred embodiment was structured to comprise the changeover valve 135 on the outside of the diffuser 131, but in the ejector 30 of this third preferred embodiment there is no changeover valve 135, but rather it is arranged that the second nozzle 132 can also fulfill the function of the changeover valve 135, so that in this regard there is a great difference from the second preferred embodiment described above. In the following explanation, elements of the third preferred embodiment which are identical to portions of the second preferred embodiment and which have the same functions will be denoted by the same reference symbols, and their description will be curtailed; thus, the ejector 30 of this third preferred embodiment will principally be described with respect to the points in which it differs from the ejector 30 of the second preferred embodiment.

In the interior of the first nozzle 133 which is fixed in the second block 137 of the diffuser 131 there are provided a small diameter hole 154 which connects to an aperture portion 155 at its tip, a large diameter hole 301 which connects to the upstream end of the small diameter hole 154, and a medium diameter hole 302 which connects to the upstream end of the large diameter hole 301, and the internal diameters of these holes increase in order from the small diameter hole 154, through the medium diameter hole 302, to the large diameter hole 301. A fluid conduit 304 which connects to the hydrogen inlet 320 provided in the second block 137 and opens at the internal surface of the large diameter hole 301 is provided in the first nozzle 133.

The second nozzle 132 which is inserted into the interior of the first nozzle 133 comprises a taper section 163, a downstream small diameter portion 161, a valve body portion 311 which continues in the upstream direction from the downstream small diameter portion 161, an upstream small diameter portion 312 which continues in the upstream direction from the valve body portion 311, and a large diameter portion 313 which continues in the upstream direction from the upstream small diameter portion 312. The large diameter portion 313 is always housed in the medium diameter hole 302 of the first nozzle 133, and is fitted so as to be slidable in the axial direction of said medium diameter hole 302. A fluid conduit 164 is provided in the second nozzle 132 to connect to the aperture portion 165 at its tip end, and the upstream end of this fluid conduit 164 is closed by a movable shaft 166. Furthermore, in the second nozzle 132 there is provided a fluid conduit 314 which is connected to the fluid conduit 164 and opens at the outer peripheral surface of the upstream small diameter portion 312.

A ring shaped seal element 315 is fitted to the downstream side end surface of the valve body portion 311 of the second nozzle 132, and the movement of the valve body portion 311 in the downstream direction is limited by this seal element 315 contacting against the upstream end surface 301a of the large diameter hole 301 of the first nozzle 133 (in the following explanation, this position of the second nozzle 132 will be termed its initial position). When the second nozzle 132 is positioned at its initial position, the small diameter hole 154 and the large diameter hole of the first nozzle 133 are cut off from one another, the downstream small diameter portion 161 is inserted into the aperture portion 155 of the first nozzle 133, and the taper section 163 projects more to the downstream side than the aperture portion 155. Furthermore, when the second nozzle 132 is positioned at its initial position, the valve body portion 311 of the second nozzle 132 is positioned as spaced in the downstream direction from the medium diameter hole 302 of the first nozzle 133, and thereby communicates together the large diameter hole 301 and the medium diameter hole 302 of the first nozzle 133.

Accordingly, when the second nozzle 132 is positioned at its initial position, the hydrogen which is supplied to the hydrogen inlet 320 flows into the large diameter hole 301 of the first nozzle 133 via the fluid conduit 304, and then flows into the fluid conduit 164 via fluid conduits 314 which are formed in the upstream small diameter portion 312 of the second nozzle 132. As a result, the hydrogen is injected into the fluid conduit 138 of the diffuser 131 from the aperture portion 165 of the second nozzle 132. This is the operational state of this ejector of the third preferred embodiment when the flow is small.

Figure 16:
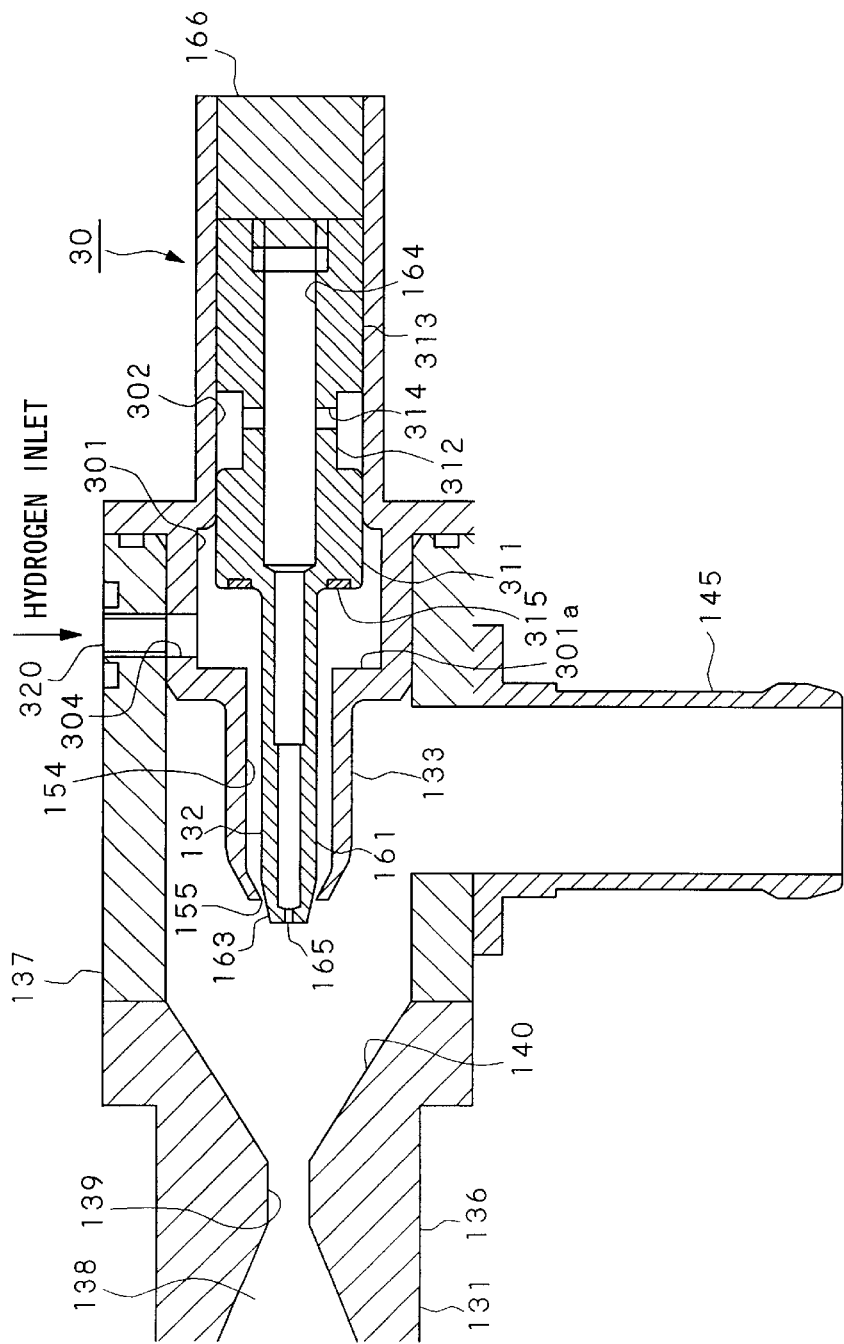
FIG. 16 is a sectional view of this ejector which is the third preferred embodiment of the fluid supply device for a fuel cell according to the present invention, and in particular shows the situation during medium and high flow operation.

When the second nozzle is retracted from its initial position in the upstream direction, then as shown in FIG. 16 the valve body portion 311 advances towards a roughly sealing state in the medium diameter hole 302 of the first nozzle 133, and, when the valve body portion 311 progresses into the medium diameter hole 302, the valve body portion 311 interrupts communication between the large diameter hole 301 and the medium diameter hole 302 of the first nozzle 133. As a result, the hydrogen which is supplied from the hydrogen inlet 320 no longer flows into the fluid conduit 164 of the second nozzle 132. In other words, hydrogen ceases to be injected from the aperture portion of the second nozzle 132. Furthermore, by the seal element 315 of the valve body portion 311 being removed from the upstream end surface 301 a of the large diameter hole 301 of the first nozzle 133, the large diameter hole 301 and the small diameter hole 154 of the first nozzle 133 are communicated together.

When the second nozzle 132 retracts to a specified position, the taper section 163 of the second nozzle 132 comes to be positioned at the aperture portion 155 of the first nozzle 133, and the aperture area of the gap between the aperture portion 155 and the taper section 163 comes to vary according to the position of the second nozzle 132. Accordingly, at this time, the hydrogen which is supplied to the hydrogen inlet 320 flows into the large diameter hole 301 of the first nozzle 133 via the fluid conduit 304, and then is injected via the small diameter hole 154 into the fluid conduit 138 of the diffuser 131 from the gap between the aperture portion 155 and the taper section 163 at a flow according to the aperture area of said gap. This is the operational state of this ejector of the third preferred embodiment when the flow is medium and when the flow is large.

Thus, according to the ejector 30 of this third preferred embodiment of the present invention, by adjusting the position of the second nozzle 132 by the drive section 134, in the same manner as with the ejector 30 of the second preferred embodiment, it is possible to deliver the required fuel flow to the fuel cells 11 while maintaining a specified stoichiometry characteristic over a wide range of flow, from a small flow to a large flow.

In particular, with the ejector 30 of this third preferred embodiment, by shifting the second nozzle 132 in the axial direction, not only is it possible to vary the aperture area of the gap between the aperture portion 155 of the first nozzle 133 and the taper section 163 of the second nozzle 132, but also it is possible to change over the flow path of the hydrogen which is supplied to the hydrogen inlet 320. That is to say, the second nozzle 132 is endowed with a fuel supply cutoff function (the function which in the second preferred embodiment described above was fulfilled by the changeover valve 135) of cutting off the supply of hydrogen to the small diameter hole 154 of the first nozzle 133 when hydrogen is to be injected into the fluid conduit 138 only from the aperture portion 165 of the second nozzle 132.

As a result, in the case of the ejector 30 of this third preferred embodiment the changeover valve 135 becomes unnecessary, and it is possible to eliminate the actuator while operating the ejector only with the drive section 134 for the second nozzle 132, so that it is possible to simplify the structure and to make it more compact.

Embodiment 4

Next, a fourth preferred embodiment of the fluid supply device for a fuel cell according to the present invention will be described with reference to FIG. 17 and FIG. 18.

Figure 17:
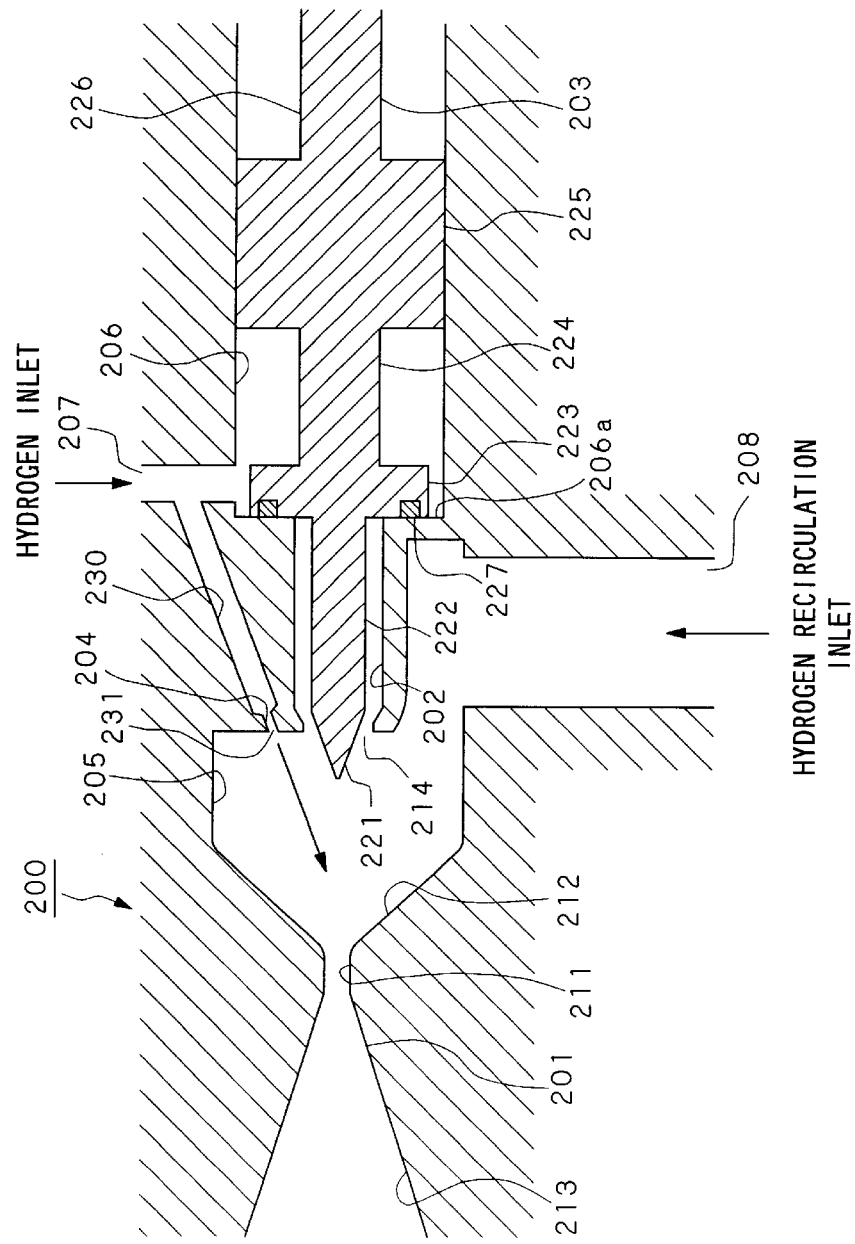
FIG. 17 is a sectional view of an ejector which is a fourth preferred embodiment of the fluid supply device for a fuel cell according to the present invention, and in particular shows the situation during low flow operation.
Figure 18:
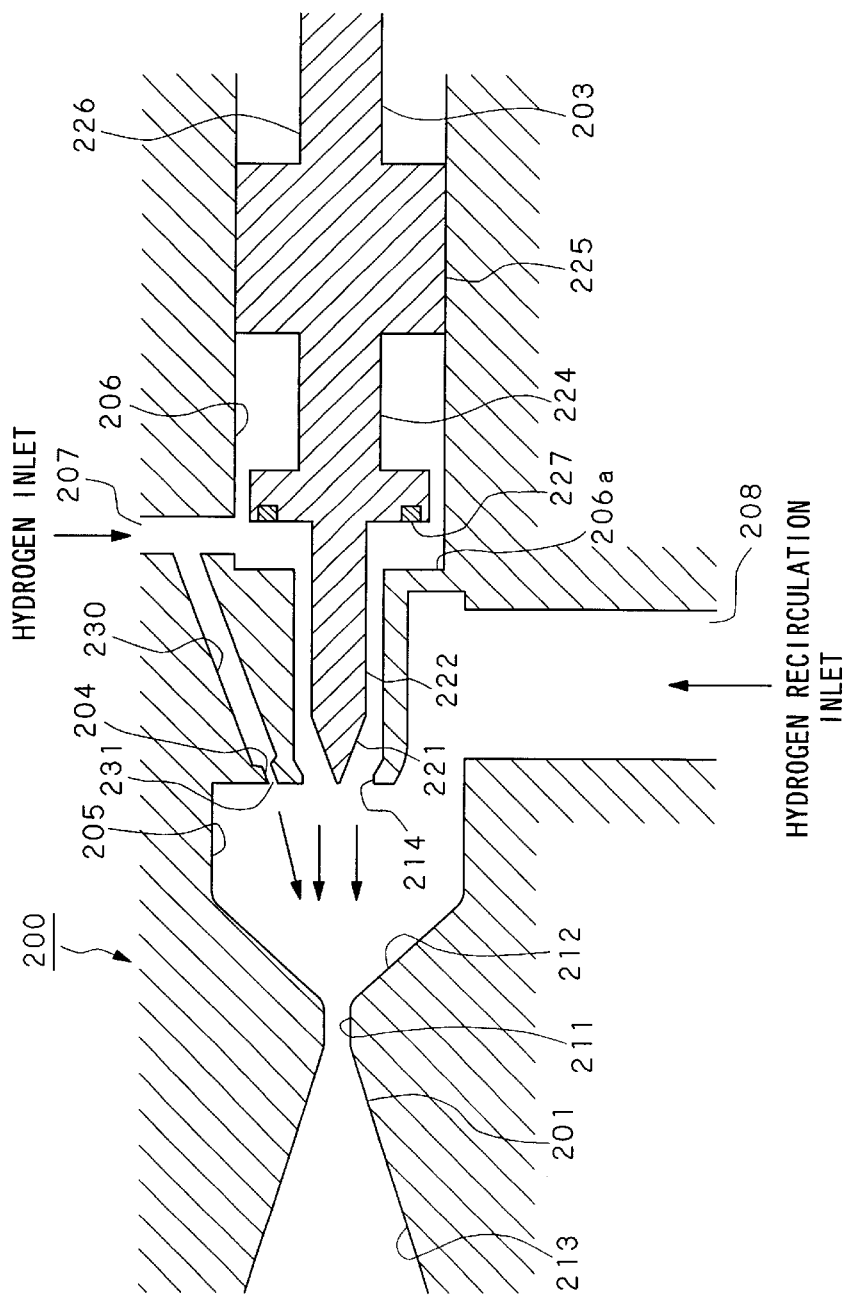
FIG. 18 is a sectional view of this ejector which is the fourth preferred embodiment of the fluid supply device for a fuel cell according to the present invention, and in particular shows the situation during medium and high flow operation.

FIG. 17 and FIG. 18 are sectional views showing the overall structure of an ejector 200 of this fluid supply device for a fuel cell.

The ejector 200 comprises a diffuser 201, a first nozzle portion 202, a needle 203, and a second nozzle portion 204.

To the diffuser section 201 there are provided, in the same manner as in the ejector 30 of the second preferred embodiment, a throat portion 211, a throttle portion 212 formed at the upstream side of the throat portion 211, and an increasing diameter portion 213 formed at the downstream side of the throat portion 211, and this increasing diameter portion 213 is connected to the fuel cells 11 via the moisturizing section 13. The ejector 200 comprises a recirculation chamber 205 which extends from the throttle portion 212, and recirculated hydrogen can be supplied to this recirculation chamber 205 from a hydrogen recirculation inlet 208.

A first nozzle section 202 is provided coaxially with the throat portion 211 of the diffuser section 201, and the tip end of this first nozzle portion 202 opens into the recirculation chamber 205 via an aperture portion 214. The upstream end of the first nozzle portion 202 extends as a needle receiving hole 206 whose diameter is greater than that of the first nozzle portion 202. This needle receiving hole 206 is connected to the hydrogen inlet 207, and is supplied with hydrogen via the hydrogen inlet 207.

A needle 203 is provided within the first nozzle portion 202 and the needle receiving hole 206 so as to be capable of being shifted along its axial direction. The tip end of this needle 203 is formed in a taper section 221 whose diameter gradually reduces along with progress in the downstream direction, and a small diameter portion 222 continues in the upstream direction from this taper section 221, a valve body portion 223 continues from the upstream end of this small diameter portion 222, a medium diameter portion 224 continues in the upstream direction from the upstream end of this valve body portion 223, a large diameter portion 225 continues from the upstream end of this medium diameter portion 224, and a shaft portion 226 continues in the upstream direction from the upstream end of this large diameter portion 225, with a drive section (not shown in the figures) being connected to the shaft portion 226 so as to shift the needle 203 in its axial direction.

The large diameter portion 225 is capable of sliding movement in the needle receiving hole 206 along the axial direction, and the valve body portion 223 is received in the needle receiving hole 206 with a gap being present between them in the radial direction. The small diameter portion 222 is inserted into the first nozzle portion 202 with a gap being present between them in the radial direction, and the taper section 221 is positioned so as to be capable of being projected or retracted from the aperture portion 214 of the first nozzle portion 202. Furthermore, a seal member 227 is fitted upon the downstream side end surface of the valve body portion 223, and this seal element 227 can be contacted against or retracted from the downstream side end surface 206a of the needle receiving hole 206. Thus, by the seal element 227 contacting against the downstream side end surface 206a of the needle receiving hole 206, not only are the first nozzle portion 202 and the needle receiving hole 206 cut off from one another, but further shifting of the needle 203 in the downstream direction is limited.

In this ejector 200, a fluid conduit 230 is provided which connects the hydrogen inlet 207 and the recirculation chamber 205, and the tip end of this recirculation conduit 230 constitutes a second nozzle portion 204 of small diameter, with an aperture portion 231 at the tip end of this second nozzle portion 204 opening with its axis facing the throat portion 211.

With this ejector 200, when a small flow of hydrogen is to be supplied to the fuel cells 11, the needle 203 is advanced to the downstream side, and as shown in FIG. 17 the seal member 227 is pressed against the downstream side end surface 206a of the needle receiving hole 206. Due to this, the hydrogen which is supplied from the hydrogen inlet 207 does not flow into the first nozzle portion 202, but rather is only injected via the fluid conduit 230 from the aperture portion 231 of the second nozzle portion 204 towards the throat portion 211, then to flow to the increasing diameter portion 213. Due to this, a negative pressure is generated in the vicinity of the throat portion 211, and the recirculated hydrogen in the recirculation chamber 205 is sucked into the increasing diameter portion 213 by this negative pressure. As a result, the hydrogen and the recirculated hydrogen mix together in the increasing diameter portion 213 and are supplied to the fuel cells 11.

When a medium flow or a large flow of hydrogen is to be supplied to the fuel cells 11, the needle 203 is retracted towards the upstream side, and as shown in FIG. 18 the seal member 227 is withdrawn from the downstream side end surface 206a of the needle receiving hole 206. Due to this, the hydrogen which is supplied from the hydrogen inlet 207 does not flow into the fluid conduit 230, but also flows into the first nozzle portion 202. As a result, along with hydrogen being injected from the aperture portion 231 of the second nozzle portion 204 towards the throat portion 211, hydrogen is also injected from the gap between the aperture portion 214 of the first nozzle portion 202 and the needle 203 towards the throat portion 211, and these two streams of hydrogen mix together in the throat portion 211 and then flow into the increasing diameter portion 213. Due to this, a negative pressure is generated in the vicinity of the throat portion 211, and the recirculated hydrogen in the recirculation chamber 205 is sucked into the increasing diameter portion 213 by this negative pressure. As a result, the hydrogen and the recirculated hydrogen mix together in the increasing diameter portion 213 and are supplied to the fuel cells 11.

Since it is possible to vary the aperture area of the gap between the aperture portion 214 of the first nozzle portion 202 and the taper section 221 of the needle 203 by adjusting the position of the needle 203, thereby it is possible to vary the flow of hydrogen which is injected from this gap by adjusting the position of the needle 203.

Accordingly, in the case of this ejector 200 of the fourth preferred embodiment as well, just as with the ejectors 30 of the second and third preferred embodiments described above, by adjusting the position of the needle 203, it is possible to deliver the required fuel flow to the fuel cells 11 while maintaining a specified stoichiometry characteristic over a wide range of flow, from a small flow to a large flow. Furthermore, it is possible to avoid deterioration of the stoichiometry when the flow is small.

Furthermore, since with this ejector 200 there is no requirement to provide any fluid conduit 164 inside the second nozzle 132 (corresponding to the needle 203 in this fourth preferred embodiment) as in the ejectors 30 of the second and third preferred embodiments described above, therefore it is possible to reduce the external diameter of the needle 203, and in accompaniment with this it is possible to reduce the internal diameters of the aperture portion 214 and the first nozzle portion 202.

Yet further, with this ejector 200, since it is arranged that the supply of hydrogen to the first nozzle portion 202 is interrupted by the seal member 227 being pressed against the downstream side end surface 206a of the needle receiving hole 206, thereby it is possible to increase the clearance between the aperture portion 214 of the first nozzle portion 202 and the needle 203 when the needle 203 is positioned at its initial position, and as a result it is possible to prevent sticking of the needle 203 to the aperture portion 214.

It should be understood that the present invention is not to be considered as being limited to the embodiments disclosed above. For example, the drive section 134 is not limited to being a linear drive type step motor, and other drive device may be used, provided that they are capable of adjusting the positions of the second nozzle 132 and the needle 203 along their axial directions.

What is claimed is:

1. A fluid supply device for a fuel cell, comprising:
   a needle which has an end portion;
   a taper section which is arranged coaxially with, and is connected to or formed integrally with, said needle;
   a nozzle which has an aperture portion at its end, with said needle and said taper section being coaxially inserted into said aperture portion, and which emits a first fluid from said aperture portion when said first fluid is supplied to the interior of said nozzle;

a diffuser which is provided coaxially with said needle, said taper section, and said nozzle, which sucks in a second flow of fluid by a negative pressure which is generated by the injection of said first flow of fluid, and which mixes said second fluid flow with said first fluid flow and supplies the mixture;

a needle position adjustment device which shifts said needle along its axial direction; and a taper section position adjustment device, which is the same as or different from the needle position adjustment device, and which shifts said taper section along its axial direction; wherein said first fluid flow passes through a first fluid conduit which is constituted by a gap between said needle and said aperture portion of said nozzle, and, after mixing with said second fluid flow, flows through a second fluid conduit which is constituted by a gap between said taper section and said diffuser.

2. A fluid supply device for a fuel cell according to claim 1, wherein said taper section is formed integrally with said needle so as to extend from said end portion of said needle, and said needle position adjustment device also serves as said taper section position adjustment device.

3. A fluid supply device for a fuel cell according to claim 1, wherein the shape of said needle is determined so that the stoichiometry value for said first fluid conduit and said second fluid conduit matches an stoichiometry value which is set in advance in correspondence with flow.

4. A fluid supply device for a fuel cell, comprising:

a needle which has a taper section at its end;

a first nozzle which has an aperture portion at its end, with said taper section of said needle being coaxially inserted into said aperture portion, and which emits a first fluid from said aperture portion when said first fluid is supplied to the interior of said first nozzle;

a diffuser which is provided coaxially with said needle and said first nozzle, and which sucks in a second fluid flow by a negative pressure which is generated by injection of said first fluid flow, mixes said second fluid flow with said first fluid flow, and supplies the mixture;

a second nozzle which has an aperture portion which faces said diffuser, and which is capable of emitting said first fluid flow from said aperture portion; and a needle position adjustment device which shifts said needle along its axial direction; wherein said first fluid flow is capable of being supplied to said diffuser from a gap between said needle and said aperture portion of said first nozzle, and said first fluid flow is capable of being supplied to said diffuser from said second nozzle.

5. A fluid supply device for a fuel cell according to claim 4, wherein sad aperture portion of said second nozzle is formed at said end portion of said needle, and said needle also serves as said second nozzle.

6. A fluid supply device for a fuel cell according to claim 4, further comprising a fluid supply interruption mechanism which, when said first fluid flow is to be supplied to said diffuser only from said second nozzle, interrupts the supply of said first fluid flow to said first nozzle.

7. A fluid supply device for a fuel cell according to claim 6, wherein said fluid supply interruption mechanism interrupts the supply of said first fluid flow to said first nozzle in accompaniment with the shifting of said second nozzle in its axial direction.

8. A fluid supply device for a fuel cell according to claim 4, wherein said aperture portion of said second nozzle is formed as separated from the axis of said first nozzle, and the axis of said second nozzle subtends a predetermined angle with respect to the axis of said first nozzle.

* * * * *